United States Patent
Qiu et al.

(10) Patent No.: US 12,268,226 B2
(45) Date of Patent: Apr. 8, 2025

(54) ARTIFICIAL DEHYDRATED-PIZZLE OF EDIBLE PET CHEW

(71) Applicants: Jiangsu Zhongheng Pet Articles Joint-Stock Co., Ltd., Jiangsu (CN); SHANGHAI SUNLIGHT INNOV TRADING CO., LTD., Shanghai (CN)

(72) Inventors: Bin Qiu, Jiangsu (CN); Guangqiang Xu, Shanghai (CN); Dequan Shen, Shanghai (CN)

(73) Assignees: Jiangsu Zhongheng Pet Articles Joint-Stock Co., Ltd., Yancheng (CN); SHANGHAI SUNLIGHT INNOV TRADING CO., LTD., Shanghai (CN)

( * ) Notice: Subject to any disclaimer, the term of this patent is extended or adjusted under 35 U.S.C. 154(b) by 208 days.

(21) Appl. No.: 17/931,540

(22) Filed: Sep. 12, 2022

(65) Prior Publication Data

US 2023/0000113 A1 Jan. 5, 2023

Related U.S. Application Data

(63) Continuation-in-part of application No. 17/481,302, filed on Sep. 21, 2021, now abandoned, which is a continuation of application No. 16/190,118, filed on Nov. 13, 2018, now Pat. No. 11,122,820, which is a continuation-in-part of application No. 15/680,721,
(Continued)

(30) Foreign Application Priority Data

Jun. 17, 2022 (CN) .......................... 202221526327.9

(51) Int. Cl.
*A01K 29/00* (2006.01)
*A23K 10/26* (2016.01)
*A23K 10/30* (2016.01)
*A23K 20/158* (2016.01)
*A23K 40/25* (2016.01)
(Continued)

(52) U.S. Cl.
CPC .............. *A23K 40/25* (2016.05); *A23K 10/26* (2016.05); *A23K 10/30* (2016.05); *A23K 20/158* (2016.05); *A23K 50/40* (2016.05); *A23K 50/42* (2016.05)

(58) Field of Classification Search
CPC ...... A23K 40/25; A23K 20/158; A23K 50/40; A23K 50/42; A23K 10/26; A23K 10/30; A23K 10/20; A01K 15/026; A01K 15/025; A23N 17/005
See application file for complete search history.

(56) References Cited

U.S. PATENT DOCUMENTS

| 6,895,900 B2 * | 5/2005 | Hingst | ................. A01K 15/026 |
| | | | 119/710 |
| 2005/0217604 A1 * | 10/2005 | Brown | .................... A23K 50/40 |
| | | | 119/710 |

(Continued)

*Primary Examiner* — Trinh T Nguyen
(74) *Attorney, Agent, or Firm* — Xuan Zhang

(57) ABSTRACT

An edible pet chew includes an artificial dehydrated-pizzle component imitating traditional dehydrated-pizzle (or bully stick), which may include a tapered head part at an end. In some embodiments, the artificial dehydrated-pizzle component is formed by injection molding process and is formed from a composite material. In some embodiments, the composite material includes at least 20% plant ingredient in formula. In some embodiments, the artificial dehydrated-pizzle component has a groove running on the surface.

22 Claims, 14 Drawing Sheets

Related U.S. Application Data filed on Aug. 18, 2017, now Pat. No. 10,159,266, application No. 17/931,540 is a continuation-in-part of application No. 17/478,986, filed on Sep. 20, 2021, now Pat. No. 12,161,088, which is a continuation-in-part of application No. 16/190,118, filed on Nov. 13, 2018, now Pat. No. 11,122,820.

(51) Int. Cl.
*A23K 50/40* (2016.01)
*A23K 50/42* (2016.01)

(56) References Cited

U.S. PATENT DOCUMENTS

| | | | | |
|---|---|---|---|---|
| 2006/0107906 | A1* | 5/2006 | Weinberg | A23K 40/30 119/710 |
| 2006/0243219 | A1* | 11/2006 | Brown | A01K 15/026 119/710 |
| 2007/0193531 | A1* | 8/2007 | Anderson | A01K 15/026 119/709 |
| 2007/0289552 | A1* | 12/2007 | Axelrod | A23K 20/163 119/710 |
| 2009/0004328 | A1* | 1/2009 | Weinberg | A23K 50/42 426/4 |
| 2011/0139087 | A1* | 6/2011 | Lang | A23K 40/25 119/709 |
| 2011/0232582 | A1* | 9/2011 | Adkins | A23K 50/42 119/710 |
| 2011/0262587 | A1* | 10/2011 | Stern | A23K 40/25 119/710 |
| 2014/0044838 | A1* | 2/2014 | Xu | A23K 50/42 426/282 |
| 2014/0137810 | A1* | 5/2014 | Stern | A23K 40/25 119/710 |
| 2014/0363537 | A1* | 12/2014 | Doerr | A23K 20/189 426/63 |
| 2017/0181449 | A1* | 6/2017 | Harbour | A23K 50/42 |
| 2021/0177007 | A1* | 6/2021 | Axelrod | A23K 10/26 |

\* cited by examiner

ARTIFICIAL DEHYDRATED-PIZZLE OF EDIBLE PET CHEW

CROSS-REFERENCES TO RELATED APPLICATIONS

This application is a continuation-in-part application of U.S. application Ser. No. 17/481,302, filed on Sep. 21, 2021, which is a continuation application of U.S. application Ser. No. 16/190,118, filed on Nov. 12, 2018, now issued as U.S. Pat. No. 11,122,820, which is a continuation-in-part application of U.S. application Ser. No. 15/680,721, filed on Aug. 17, 2017, now issued as U.S. Pat. No. 10,159,266. This application is also a continuation-in-part application of U.S. application Ser. No. 17/478,986, filed on Sep. 20, 2021, which is a continuation-in-part application of U.S. application Ser. No. 16/190,118, filed on Nov. 12, 2018, now issued as U.S. Pat. No. 11,122,820, which is a continuation-in-part application of U.S. application Ser. No. 15/680,721, filed on Aug. 17, 2017, now issued as U.S. Pat. No. 10,159,266. This application also claims priority to CN Application No. 202221526327.9, filed on Jun. 17, 2022 and entitled "Artificial Dehydrated-pizzle of Edible Pet Chew".

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE DISCLOSURE

The field of this disclosure relates to an Edible Pet Chew, and more particularly to an artificial dehydrated-pizzle (artificial bully stick) of edible pet chew.

DESCRIPTION OF RELATED ARTS

Domestic pets, primarily dogs, have an instinct to chew which keeps their teeth clean and healthy, exercises their jaws, gums and teeth and makes them busy for a period of time. "Pet Chew" products have been introduced to the market for many years to accommodate that instinctive urge to chew in a healthy direction.

"Pet Chews" are intended to be chewed by a pet/dog for an extended period of time before being digested. A great part of the pet chew products on the market are traditional "dehydrated pizzle" product such as dried bully pizzle, pig pizzle. Among them, bully sticks are especially welcome by dogs and consumers, which are made of natural bovine penis. Generally, foreskin of bovine penis is removed, cleaned and then dehydrated by for example heating or freeze-drying. Some other pet chews in the art are developed utilizing a natural part or a natural organ of a slaughtered animal to accommodate the chewing needs from pets. These chew toys may have a high price per gram, raw material scarcity, strong unpleasant stink or too great rigidity quality presenting jeopardy to puppies or old dogs.

On the market, there are other popular products in a three-dimensional form processed by injection-moulding, cast moulding or compression moulding (especially by injection molding), appearing in various appealing shapes such as toothbrush, hedgehog, tortoise, crocodile. Also, on the market, there is another kind of popular products in a form of injection-molded or extruded stick. These kinds of products may be commercialized by many distributors or retailers under great competitions, where the competition is a homogeneous one, resulting in the products being hard to be well distinguished from another. It is not easy for a homogeneity product to attract consumers to buy.

Attention is directed to U.S. application Ser. No. 13/858,592 by Shrestha, filed on Apr. 8, 2013, discloses a pet chew including a hardened cheese and a dry animal tissue such as bully sticks attached to the cheese piece. And it also discloses a kind of animal tissue puff such as bully stick puff. U.S. Pat. No. 8,479,687 by Anderson, filed on Feb. 14, 2007, discloses a pet chew with rawhide and traditional bully stick (or steer penis) woven together. U.S. Pat. No. 8,074,609 by Grant Adkins, filed on Mar. 25, 2010, discloses a rawhide pet chew with a traditional bully stick wrapped in. U.S. Pat. No. 7,677,203 by Stern, filed on Nov. 21, 2006, discloses a pet chew with a plant based outer casing and a chewy edible material positioned within the casing. U.S. application Ser. No. 14/295,009 by Doerr, filed on Jun. 3, 2014, discloses a pet chew including an amylase filling and a collagen casing. Attention is also directed to U.S. Pat. No. 7,691,426 by Doerr Axelrod, filed on Jun. 9, 2006, discloses an animal chew combining a rawhide member and edible resin one.

What is required is to provide a pet chew overcoming some drawbacks accompanying the products.

SUMMARY OF THE PRESENT DISCLOSURE

An embodiment of the present disclosure is to provide a pet chew including a stick-shaped component imitating or approximating traditional dehydrated pizzle (or bully stick) product which are very much welcome by dogs and their owners.

An embodiment of the present disclosure is to provide a pet chew with both "inherently good palatability" and "strong durability" simultaneously.

Another embodiment of the present disclosure is to provide an edible pet chew serving as an alternative to existing traditional dehydrated pizzle (or bully stick) product by imitating/approximating the structure, and/or shape, and/or appearance, and/or size, and/or color, and/or texture, and/or flavor, and/or durability, and/or palatability of traditional dehydrated pizzle (or bully stick) product.

Yet another embodiment of the present disclosure is to provide an edible pet chew incorporating some features from two existing popular products into a single product, where the two existing products are plant-based injection-molding-formed product and traditional dehydrated pizzle (or bully stick) product.

Another embodiment of the present disclosure is to provide a pet chew including a stick-shaped Artificial dehydrated-pizzle component having a tapered head portion at an end of it and a body portion, in which one end of the tapered head portion joins or meets the body portion, similar to a traditional dehydrated pizzle (or bully stick) product. It should be noted that in the present disclosure, the term of "portion" (a portion of an object) refers to a part of the object integrated with it, and the "portion" of the object is not a separate part of the object.

An embodiment of the present disclosure is to provide a pet chew including a stick-shaped Artificial dehydrated-pizzle component having a head portion at an end of it and a body portion similar to traditional dehydrated pizzle (or bully stick) product, in which there may be a neck portion (such as a latitudinal ridge portion) existing between the head part and the body part.

An embodiment of the present disclosure is to provide a pet chew including a stick-shaped Artificial dehydrated-pizzle component having a head portion at an end of it, where the head portion has a rounded or pointed tip at one end of it, similar to a traditional dehydrated pizzle (or bully stick) product.

An embodiment of the present disclosure is to provide a pet chew including a stick-shaped Artificial dehydrated-pizzle component having a tapered head portion at an end of it, where the tapered head portion has a rounded or pointed tip at one end of it, similar to a traditional dehydrated pizzle (or bully stick) product.

An embodiment of the present disclosure is to provide a pet chew including a stick-shaped Artificial dehydrated-pizzle component having a tapered head portion/part at an end of it, a body portion/part and a latitudinal ridge portion/part between the head and body portions/parts, similar to a traditional dehydrated pizzle (or bully stick) product.

An embodiment of the present disclosure is to provide a pet chew including a stick-shaped Artificial dehydrated-pizzle component having a tapered head portion/part at an end of it, a body portion/part and a raised portion/part (raised area) between the head and body portions/parts, similar to a traditional dehydrated pizzle (or bully stick) product An embodiment of the present disclosure is to provide a pet chew including a stick-shaped Artificial dehydrated-pizzle component having a tapered head portion/part at an end of it, a body portion/part and a substantially oval, substantially round, substantially heart-shaped or substantially water-drop-shaped flat portion/part, similar to a traditional dehydrated pizzle (or bully stick) product.

An embodiment of the present disclosure is to provide a pet chew including a stick-shaped Artificial dehydrated-pizzle component having a tapered head at an end of it. In at least one embodiment, the artificial dehydrated-pizzle component is made of a composite/composition material including plant ingredient and animal ingredient (typically meat and/or meat-by-products materials), imitating or approximating a traditional dehydrated pizzle (or bully stick) product which has a tapered head.

Another embodiment of the present disclosure is to provide a stick-shaped Artificial dehydrated-pizzle pet chew with a tapered head portion at an end of it made of a material with pizzle ingredient imitating or approximating a traditional dehydrated pizzle (or bully stick) products.

An embodiment of the present disclosure is to provide a pet chew including a stick-shaped Artificial dehydrated-pizzle component having a tapered head portion at an end of it, where the component has at least one (built-in) groove extending longitudinally on the surface of it (esp. on the surface of the body portion of the component), similar to traditional dehydrated pizzle (or bully stick) product.

An embodiment of the present disclosure is to provide a pet chew including a stick-shaped Artificial dehydrated-pizzle component having a tapered head portion at an end of it, where the component has two separate longitudinal grooves running along the length on the surface of the body portion of the component.

In another embodiment of the present disclosure, an artificial dehydrated-pizzle (man-made bully stick) pet chew is provided with an injection-molding-processed artificial dehydrated-pizzle member/component formed from a single piece of material without divided segments, with a longitudinal hole extending inside the body of the stick-shaped chew.

An embodiment of the present disclosure is to provide a pet chew including a stick-shaped Artificial dehydrated-pizzle component having a tapered head portion at an end of it, where the Artificial dehydrated-pizzle component has an outer layer and an inner member. The outer layer is with good durability and strength in an imitation to a feature of traditional bully stick.

In another embodiment of the present disclosure, an artificial dehydrated-pizzle (man-made bully stick) pet chew is provided including an injection-molding-processed artificial dehydrated-pizzle member/component formed from a single piece of material that may not include outer layer or inner segment, which imitates a feature of traditional dehydrated pizzle (or bully stick).

In another embodiment of the present disclosure, an artificial dehydrated-pizzle (man-made bully stick) pet chew is provided with a tapered head part, which is shaped to a final product shape such as stick shape, twisted stick shape, spiral shape, pretzel knot shape, knotted bone shape, ring shape, woven braid shape and etc.

In another embodiment of the present disclosure, an artificial dehydrated-pizzle (man-made bully stick) pet chew is provided with one or more injection-molding-processed artificial dehydrated-pizzle member(s)/component(s) being manipulated/shaped to a stick shape, a twisted stick configuration, a spiral shape, a pretzel knot, a knotted bone shape, a ring shape or a woven braid configuration alternatively before being hardened to a final product.

An embodiment of the present disclosure is to provide a stick-shaped artificial dehydrated-pizzle pet chew with a cross section outline shape (a cross section by cutting through a position at the body portion of the artificial dehydrated-pizzle) similar to that of a corresponding traditional dehydrated pizzle (or bully stick).

Another embodiment of the present disclosure is to provide an edible pet chew formed from a composite/composition material.

Another embodiment of the present disclosure is to provide an artificial bully stick (or bully-stick-like, or man-made bully stick, or artificial dehydrated-pizzle) pet chew which is hugely cheaper than a corresponding traditional bully stick (or dehydrated pizzle) product.

Another embodiment of the present disclosure is to provide an artificial bully stick (man-made bully stick, or artificial dehydrated-pizzle) pet chew which is raw-material-acquisition comparatively hugely easier than a corresponding traditional dehydrated pizzle (or bully stick).

An embodiment of the present disclosure is to provide a stick-shaped pet chew with pizzle material. The stick is obtained by injection-molding process, to achieve the "strong durability" property of the pet chew products.

An embodiment of the present disclosure is to provide an edible pet chew with limited animal hide ingredient in the products or even without animal hide ingredient.

In one aspect of the present disclosure, an edible pet chew is provided including an artificial dehydrated-pizzle (artificial bully stick, or man-made bully stick) chew member/component and an additional edible material member/component being assembled together to form a final product.

In one embodiment of the present disclosure, an edible pet chew includes an artificial dehydrated-pizzle (artificial bully stick) member/component and an animal pizzle material (as an additional edible material member/component) being assembled together with the artificial dehydrated-pizzle component to form a final product.

In another embodiment of the present disclosure, an edible pet chew includes an artificial dehydrated-pizzle (artificial bully stick) member/component and an animal hide material (as an additional edible material member/component) being assembled together to form a final product.

In yet another embodiment of the present disclosure, an edible pet chew includes a stick-shaped artificial dehydrated-pizzle (artificial bully stick) component and more than one additional ball-shaped edible material components being assembled together, forming a kabob configuration final product.

These and other embodiments of the present disclosure will become apparent from the following detailed description, the accompanying drawings, and the appended claims.

DETAILED DESCRIPTION OF THE DISCLOSURE

Figure 1:
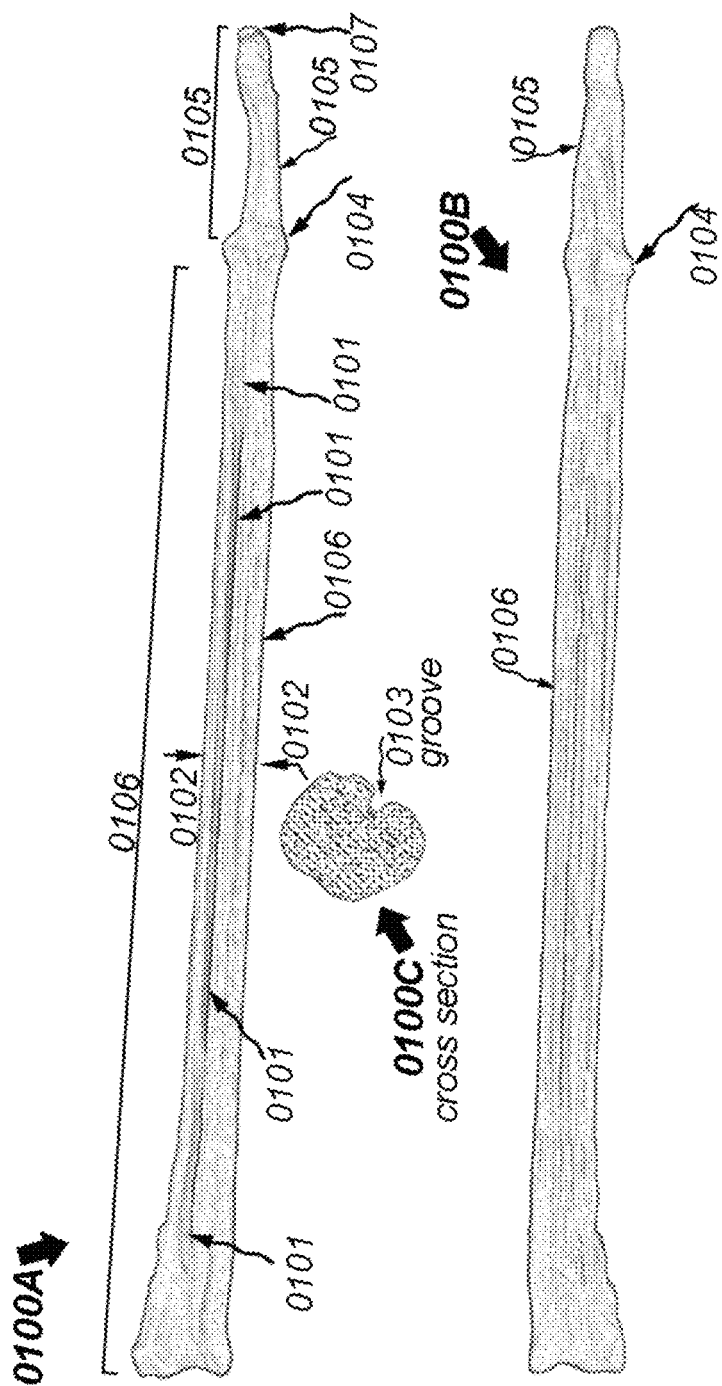
FIG. 1 is a top plan view (and a bottom view) of a stick-shaped Artificial dehydrated-pizzle pet chew according to the disclosure, where the Artificial dehydrated-pizzle has three parts, a tapered head part at an end of it, a stick-shaped body part, a latitudinal ridge part between the head and a body part, similar to traditional dehydrated pizzle (or bully stick) product, which is formed from a single piece of material with a longitudinal groove on the surface of the body part.

Embodiments are provided in the following description only as examples. The general principles defined in the following description would be applied to other embodiments, alternatives, modifications, equivalents, and applications without departing from the spirit and scope of the present disclosure.

The term of "pizzle" in the present disclosure refers to the penis of an animal (especially a bull), which may be one of, but not limited to, beef pizzle, bovine pizzle, bully pizzle, cattle pizzle, swine pizzle, horse pizzle, donkey pizzle, deer pizzle, ovine pizzle, caprine pizzle, sheep pizzle and goat pizzle. Bovine (especially bull) penis is known in pet chew trade as a kind of pizzle, which may be usually called beef pizzle or bully pizzle in the trade. The term of "dehydrated pizzle" refers to a pet chew product made of animal pizzle which is processed by a dehydration process (for example, it is dehydrated to arrive at a final product moisture level of 8%-18% which provides shelf-stable quality for the final product) before being formed to a final product, where the dehydration process may be solar drying, heating or freeze drying. The term of "bully stick" refers to a pet chew product of dehydrated animal (especially but not limited to bovine animal, bovine especially referring to bull or steer) pizzle/penis, or segment thereof, for dogs to chew on, where the pizzle is derived from a natural animal penis cut from slaughtered animals (especially bovine), typically with foreskin being removed. The bully stick is one of the aforementioned dehydrated pizzle chew. The bully stick is so called traditional bully stick substantially made of a dehydrated natural part (or natural organ) of an animal (especially bovine).

Stick-shaped pet chew of the present disclosure is intended to work as an alternative to traditional (genuine) dehydrated pizzle (or bully sticks) aforementioned.

The term of "Artificial dehydrated-pizzle" pet chew in the present disclosure refers to a pet chew or a pet chew member/component in a shape of a dehydrated pizzle (typically in a shape of a stick, or in a novel shape such as ring, twist, spiral, etc.), being formed from a composite/composition material and imitating or approximating some features of a dehydrated pizzle (or a bully stick product) including the shape, and/or structure, and/or appearance, and/or size, and/or color, and/or texture, and/or flavor, and/or durability, and/or palatability features, and it is not a traditional (genuine) dehydrated pizzle product or a bully stick product. Artificial Dehydrated-Pizzle may also be called man-made dehydrated-pizzle, synthetic dehydrated-pizzle, fake dehydrated-pizzle or dehydrated-pizzle substitute. The term of "Man-made bully stick" pet chew (or say bully-stick-like pet chew, or artificial bully stick pet chew) in the present disclosure refers to a pet chew or a pet chew member/component in a shape of stick, being formed from a composite/composition material and imitating or approximating some features of a traditional (genuine) bully stick product including the shape, and/or structure, and/or appearance, and/or size, and/or color, and/or texture, and/or flavor, and/or durability, and/or palatability features, and it is not a traditional (genuine) bully stick product. The term of "stick" generally refers to a long thin piece object. The term of "composite" generally refers to something that is formed from different materials or ingredients. For examples, a composite is formed from a formula including a plant ingredient, an animal ingredient and a chemical.

The term of "longitudinal" or "longitudinally" generally means "in a direction or position along the length of something". In contrast, "latitudinal" or "latitudinally" in the present disclosure generally means "in a direction widthwise, or horizontally, or substantially perpendicular to the centerline of an object on the surface". For example, when something extends "latitudinally" on/in the surface of a cylindrical object, it runs along a circumferential of the cylindrical object in a direction substantially perpendicular to the centerline of the cylindrical object.

Figure 2:
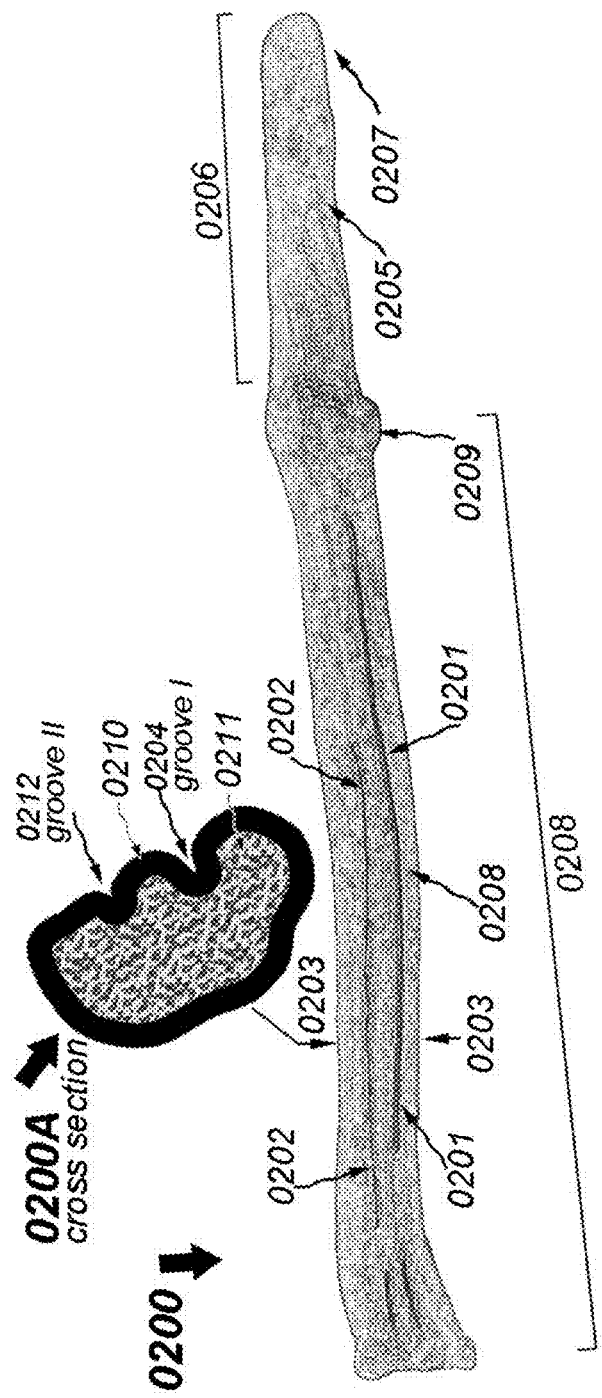
FIG. 2 is a top plan view of a stick-shaped Artificial dehydrated-pizzle pet chew according to the disclosure, where the Artificial dehydrated-pizzle has three parts, a tapered head part at an end of it, a stick-shaped body part, a latitudinal ridge part between the head and a body part, similar to traditional dehydrated pizzle (or bully stick) product with two separate longitudinal grooves on the surface of the body part.
Figure 4:
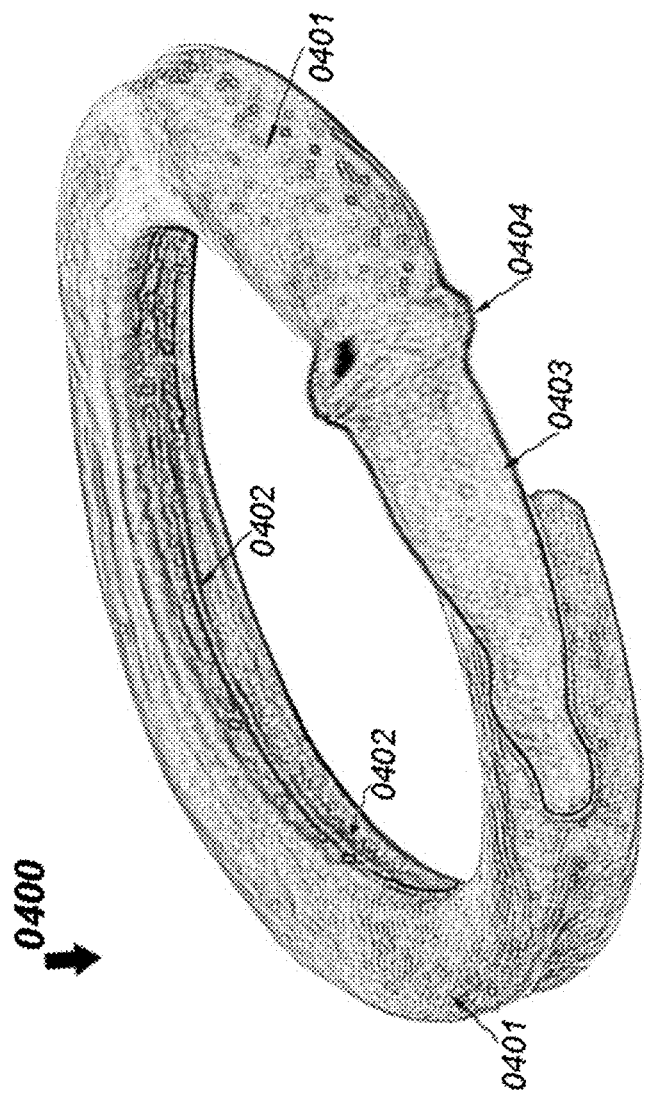
FIG. 4 is front elevation view of a pet chew according to the disclosure in a ring configuration, which is formed from a stick-shaped Artificial dehydrated-pizzle with a tapered head part at an end of it, or formed from an initially ring-shaped Artificial dehydrated-pizzle component.

It is known that a market-popular pet chew product should include two major factors, i.e. property of "strong durability" and property of "inherently good palatability". "Strong durability" means a material that can endure a dog's chewing for a fairly long time before being ingested. "Good palatability" means a material with inherent attractant to dogs without adding additional artificial flavorings. A market-successful pet chew product may be required to have both properties. The artificial dehydrated-pizzle (artificial bully stick) pet chew disclosed by the present disclosure may be a product with both "inherently good palatability" and "strong durability". The term of "Single piece" or "one-piece" refers to a material consisting of or made in a single undivided piece that may not have divided or separate segments therein. The "single piece of material" is not the one that is formed from plural pieces that have been joined or welded together. For example, the pet chews as illustrated in FIG. 1, FIG. 6, FIG. 7 and FIG. 14 include artificial dehydrated-pizzle components formed from a single piece of material. The artificial bully stick chew stick components from the pet chews as illustrated in FIG. 2 and FIG. 4 may be in a configuration with outer layer and inner member, which are not considered as being formed from a "single piece of material", or may be alternatively formed from a single piece of material according to desire.

Figure 10:
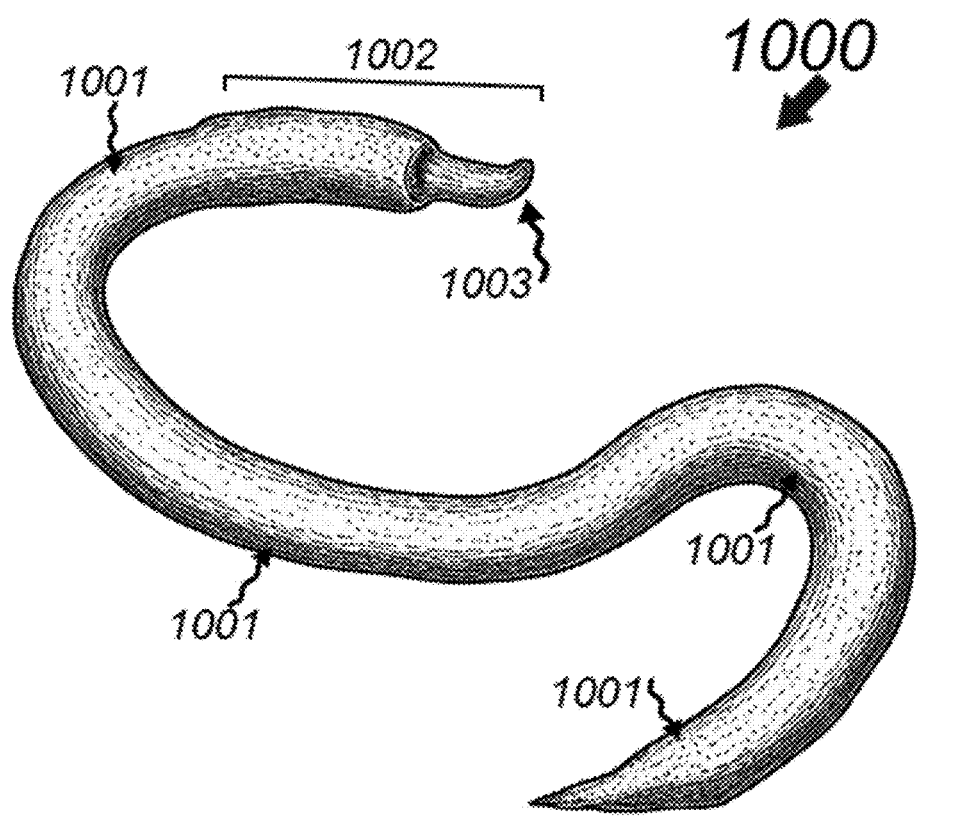
FIG. 10 is a prior art, a top plan view of a fresh bovine pizzle in full length configuration having a tapered head part at an end of it and a body part, which works as a starting material for producing a traditional dehydrated pizzle (or bully stick).

Before disclosing embodiments of the present disclosure, let's address the typical specification/structure/configuration characteristics and manufacturing process that these traditional (genuine) dehydrated pizzle (or bully sticks) products, may present as follows (from points 1 to 6):

1. Prepare a piece of fresh pizzle. Now refer to FIG. 10 (Prior Art), fresh pizzle 1000 gets ready which is cut from a slaughtered animal (esp. bovine). 1000 refers to a kind of full length pizzle including both shaft part (body part) 1001 and glans penis part 1002. Body part 1001 refers to the body part of the bovine penis. The body part 1001 is a typical material of a pizzle that is universally applied to make Bully Sticks. Glans penis part 1002 refers to glans of the pizzle with head 1003, which also can be included in finished products in some specific products (these specific products may be called full length bully sticks).

Figure 11:
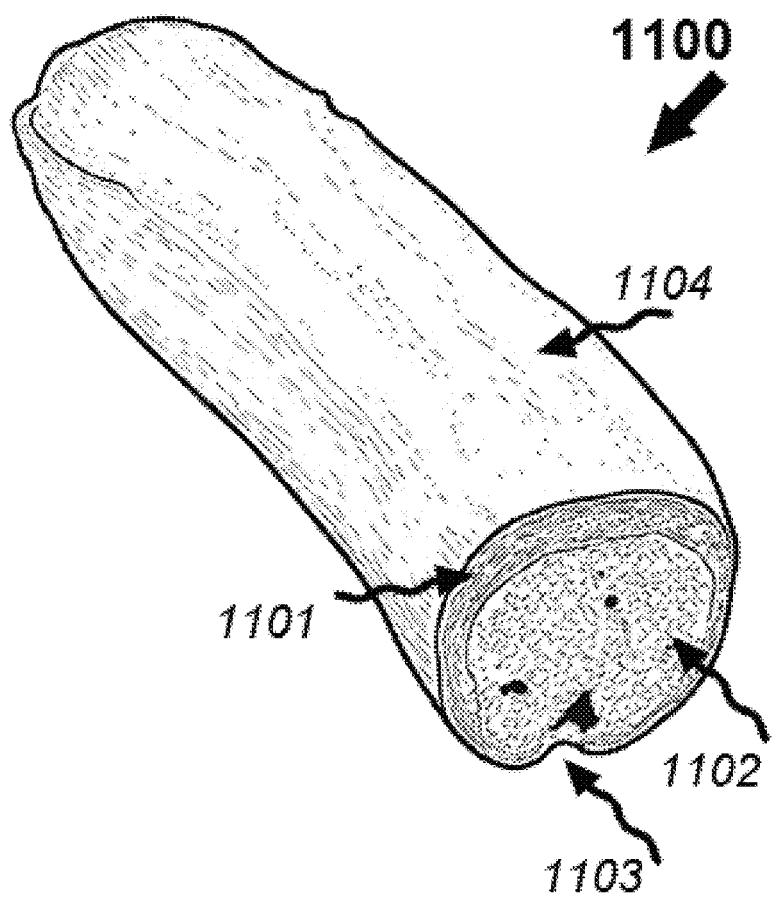
FIG. 11 is a prior art, a front elevation view of a segment of a fresh bovine pizzle.

2. FIG. 11 (Prior Art) is a segment of a fresh pizzle. Groove 1103 refers to a groove longitudinally along the whole pizzle. Outer layer 1101 is muscle of the pizzle, serving as an outer layer for the whole pizzle piece distinguished from the inner member 1102. Surface 1104 is the surface of the pizzle. Inner member 1102 includes tissues of corpus cavernosum, spongiosum, urethra, etc.

Figure 12:
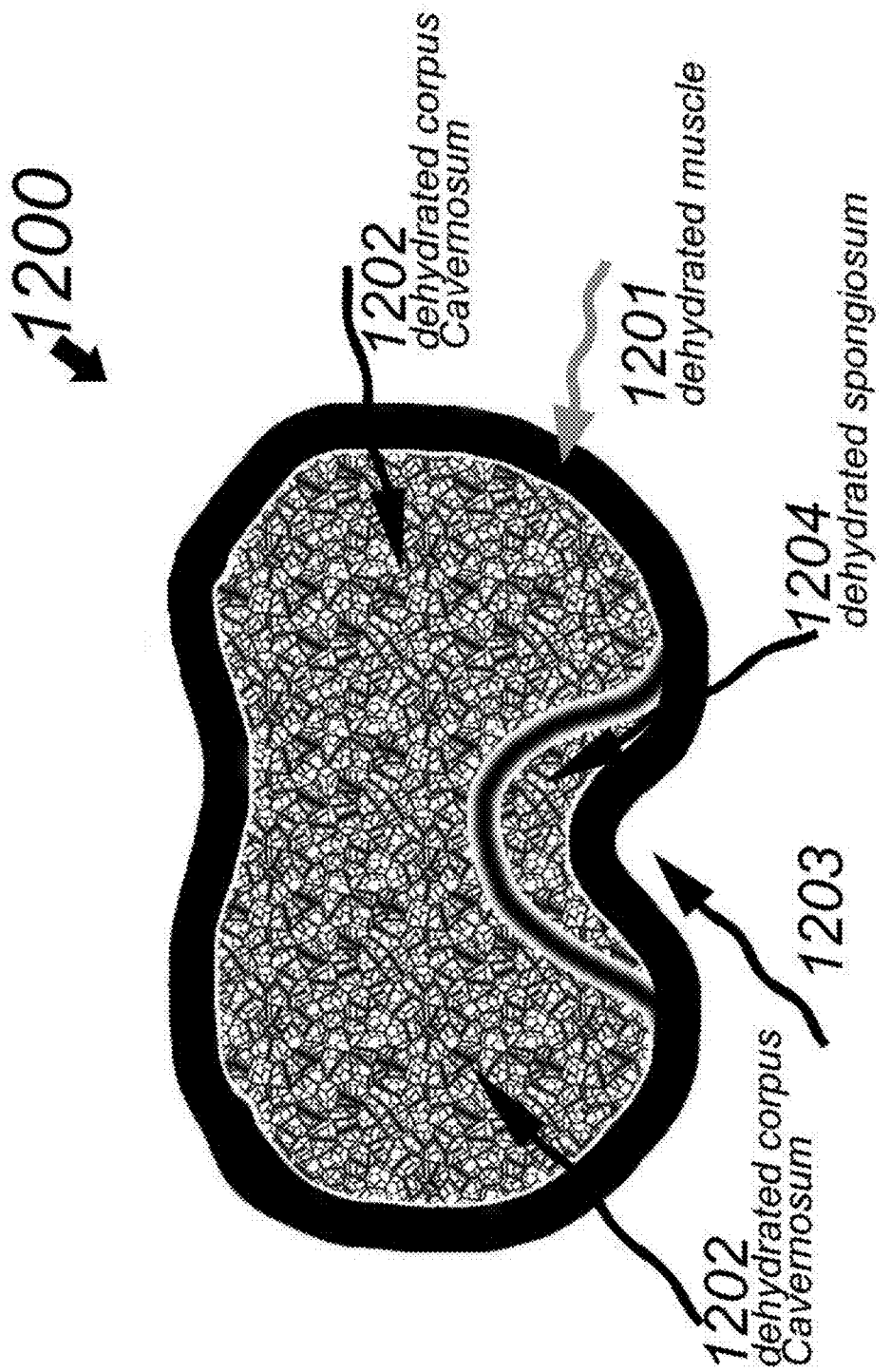
FIG. 12 is a prior art, a cross-section view of a final product of traditional dehydrated pizzle (or bully stick) after dehydrating process.

3. Have the pizzle dehydrated by means such as solar drying, heating or freeze drying. FIG. 12 (Prior Art) is a cross section figure for a final bully stick product after dehydrating process. This cross section is in a typical outline shape similar to capital letter "B". 1201 is dehydrated muscle in hard quality. 1202 is dehydrated corpus cavernosum. 1203 refers to a notch/groove (u-shaped notch) longitudinally along the pizzle. 1204 is dehydrated spongiosum. The term of "notch" in this disclosure generally refers to a small cut (typically u-shaped, v-shaped or circular cut) on the surface or edge of something.

Figure 9:
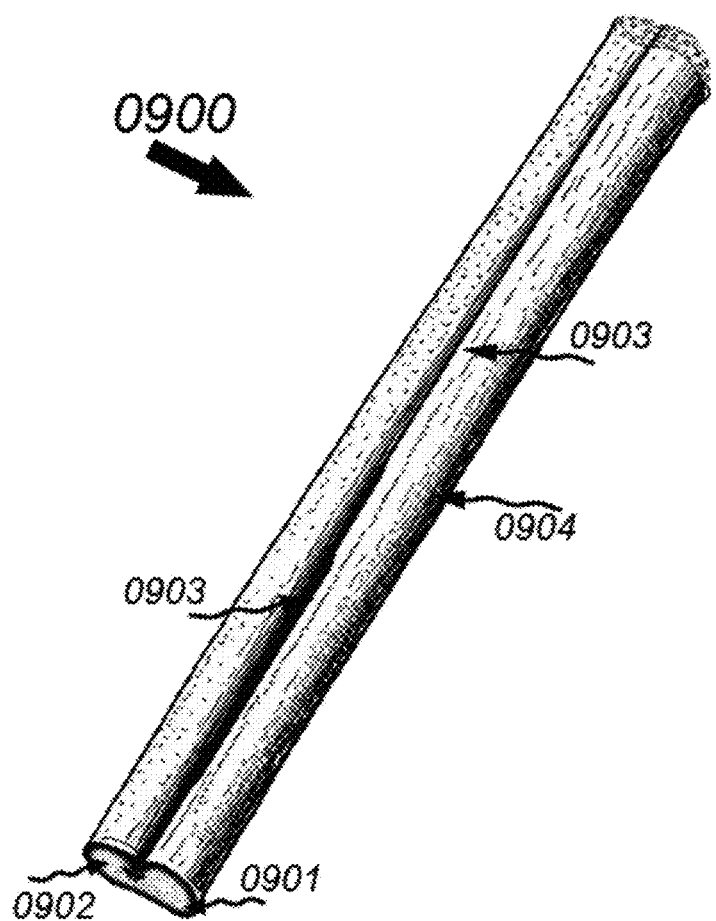
FIG. 9 is a prior art, a top plan view of a final product of a dehydrated bully stick with a groove running on the surface and with a typical cross section outline shape resembling capital letter "B".

4. As a typical final product, a dehydrated bully stick may have a tapered head part and a body part. It may also include a latitudinal ridge part, but in some bully stick products, this ridge part does not exist or is hardly noticeable. The groove extends longitudinally along a part of the bully sticks' body part on its surface. The tapered head may be taped to a rounded tip or a pointed tip alternatively at one end of it. FIG. 9 (Prior Art) is another final product, a dehydrated bully stick with a typical cross section outline shape similar to capital letter "B". 0901 and 0904 is a hard outer layer of the bully stick made of dehydrated muscle. 0902 is an inner member including tissues of corpus cavernosum, spongiosum, urethra, etc. 0903 refers to a groove longitudinally along the whole bully sticks body on its surface.

5. Cross-section of a body part of a dehydrated pizzle (bully sticks) may have a variety of shapes. Some typical cross-section shapes may resemble a letter "B", an Arabic "8" shape, a heart shape, a peanut shape or a cashew nut shape similar to those illustrated in FIG. 13.

6. The typical outstanding features (such as structure features) of a natural dehydrated pizzle (or bully stick) product may be derived from and determined by the aforementioned natural features of a natural animal (bovine) penis. A typical traditional dehydrated pizzle (or bully stick) product may have some typical features as follows (from A to K):

A. It is inherently a stick-shaped product. And in some other bully stick products, it is initially in a stick-shape material and is finally manipulated to a desired shape such as Knot, Spiral, Twist, Ring and Braid different from the initial stick shape.

B. The stick-shaped dehydrated pizzle may have a stick-shaped body part and a tapered head part at an end. The tapered head part may have a rounded or pointed tip at one end of it and at the other end of it, it joins or meets the stick-shaped body part. The tapered head part originates from the glans part of a fresh pizzle, and the body part of the dehydrated pizzle does from a body part of a fresh pizzle.

C. At least one inherent groove part may appear longitudinally along the Bully Sticks body part on the surface. The products as prior arts in FIG. 12 (Prior Art) and FIG. 9 (Prior Art) reflect this feature. This structural feature (groove) is a common one to most typical bully sticks products. It should be noted that arriving at identifying this common feature requires careful observations. There are various shapes/structures/appearance that bull stick products possess, which makes it hard to identify a common structural feature. The present applicant arrives at that, "groove" is a key feature that most typical bully sticks products possess although they have various shapes/structures and various cross section shapes. This disclosure discloses an imitation method to imitate or approximate traditional dehydrated pizzle (or bully stick) appearance.

D. Cross section of traditional bully stick (or dehydrated pizzle) may present characteristic outline shapes. A typical outline may be in a shape similar to capital letter "B", peanut (peanut icon), cashew nut (cashew nut icon), Arabic numeral "8", or heart icon. These typical outline shapes may have a common feature that they have a "notch" area whose bottom is significantly lower than the outline's overall edge. The "notches" appearing on the outline shapes are created by aforementioned "groove" that runs longitudinally along the bully stick body part. The items illustrated in FIG. 12 (Prior Art) and FIG. 9 (Prior Art) reflect this feature. These outline shapes are created by an inherent feature of natural pizzle.

E. Bully stick may have an animal pizzle as its single ingredient, which is a very strong flavor one enjoying irresistible attraction to dogs. Animal pizzle ingredient offers "inherently good palatability" for the pet chew.

F. Pizzle flavor. Traditional dehydrated pizzle (or bully stick) has an inherent characteristic pizzle flavor, which greatly attracts dogs to chew on. As a sort of meat-by-products material, pizzle has a naturally strong flavor as other meat-by-products do, attractant to dogs.

G. Bully stick may include an outer layer and an inner member/component, where the former holds the latter by surrounding it. This structure is derived from pizzle inherent structure. The outer layer is formed by muscle and inner member/component formed by tissues of corpus cavernosum, spongiosum, urethra, etc. Products in FIGS. 12 (Prior Art) and 9 (Prior Art) reflect this pet chew structure.

H. After being dehydrated, inherently, the outer layer of Bully Stick formed by muscle enjoys a property of getting hard. The hardness ideally accommodates dog's chewing desire, making it an ideal pet chew product. Traditional dehydrated pizzle (or bully stick) makes itself outstanding with extraordinary durability or hardness.

I. Typical range of thickness of the outer layer is 0.3 mm-5 mm.

J. Typical properties of the inner member/portion include: spongy, comparatively more unconsolidated or looser in texture than the muscle outer layer/portion. For example, in FIG. 9 (Prior Art), product 0900 has an inner member 0902 which includes tissues of corpus cavernosum, spongiosum and urethra, which is unconsolidated. And there are some small bubbles/blisters spread substantially homogeneously to the inner member material. Refer to FIG. 12 (Prior Art), 1202 from bully stick has a plurality of tiny bubbles. These properties of inner member are created by the nature of corpus cavernosum and/or spongiosum tissues that exist in a pizzle.

K. Inner member/portion and outer layer/portion have different appearance in color and/or texture. Inner member/portion color is comparatively lighter than outer layer/portion color. Inner member/portion color is typically white or yellowing white. Outer layer/portion color is typically light brown, brown, dark brown, red brown or muscle color. For example, FIG. 12 (Prior Art) and FIG. 9 (Prior Art), product 1200/0900 has an inner member 1202/0902 which includes tissues of corpus cavernosum, spongiosum and urethra, which is unconsolidated. And there are some small bubbles/blisters spread substantially homogeneously to the inner member material. Refer to FIG. 12 (Prior Art), 1202 from bully stick has tiny bubbles. These properties of inner member may be created by the nature of corpus cavernosum and/or spongiosum tissues that exist in a pizzle.

An artificial dehydrated-pizzle (or artificial bully stick, or bully-stick-like, or man-made bully stick) Pet Chew of the present disclosure imitating genuine dehydrated pizzle (or bully stick) is provided serving as an alternative to aforementioned traditional (real) dehydrated pizzle (or bully sticks). The artificial dehydrated-pizzle pet chew may provide significantly lower product cost and imitation to some necessary properties or features (at least including shape or appearance features) of a traditional dehydrated pizzle (or bully stick). An artificial dehydrated-pizzle (or artificial bully stick, or man-made bully stick) pet chew as provided herein is well distinguished from traditional dehydrated pizzle (or bully stick), which is typically an injection-moulding (cast moulding or compression moulding, or extruded) stick-shaped product formed from a composite material with plant ingredient. As a contrast, traditional dehydrated pizzle (or bully stick) is substantially a single ingredient product primarily without being processed other than a dehydrating process.

One advantage of the artificial dehydrated-pizzle (or artificial bully stick, or man-made bully stick) pet chew may be its hugely cheaper material cost than traditional dehydrated pizzle (or bully stick). The artificial dehydrated-pizzle (artificial bully stick) pet chew may be significantly cheaper than traditional dehydrated pizzle (or bully stick) made of substantially 100% animal (bovine) pizzle. The latter could be 4 times of the price of the former. Due to the natural scarcity property with the source of natural animal (bovine) pizzle, raw materials (animal pizzle) for producing traditional dehydrated pizzle (or bully stick) are sold at a very high price, which results in the final products, traditional dehydrated pizzle (or bully stick), being sold to consumers at an extraordinarily high price. Another advantage is the easier acquisition of raw material versus traditional dehydrated pizzle (or bully stick) products. Producing traditional dehydrated pizzle (or bully stick) products requires huge volume of natural animal pizzle. In one embodiment, the artificial dehydrated-pizzle (or artificial bully stick, or man-made bully stick) pet chew of the present disclosure is formed from a composite/composition with meat-by-product ingredient (such as pizzle). For example, the composite/composition has 10% pizzle in formula (90% is non-pizzle ingredient which is extremely acquisition-easier material than pizzle), in which producing this product just requires about one tenth of pizzle material to manufacture the same quantity of finished products versus traditional dehydrated pizzle (or bully stick) products. Preparing the composite/composition materials for production of artificial dehydrated-pizzle (artificial bully stick) pet chew is much easier than that for production of traditional dehydrated pizzle (or bully stick).

Figure 5:
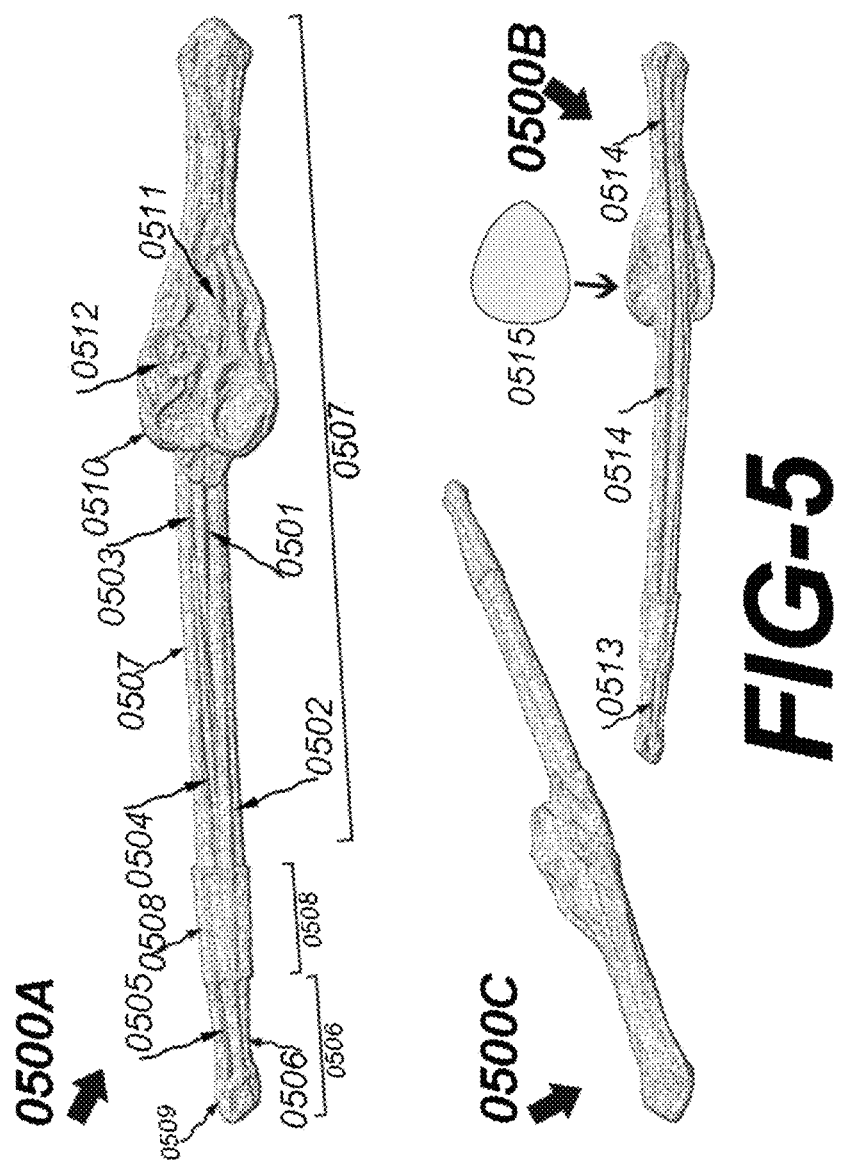
FIG. 5 is a top plan view (bottom view, oblique view) of a stick-shaped Artificial dehydrated-pizzle pet chew according to the disclosure, where the Artificial dehydrated-pizzle has a head part at an end of it, a stick-shaped body part and a substantially round part, similar to traditional dehydrated pizzle (or bully stick) product.
Figure 8:
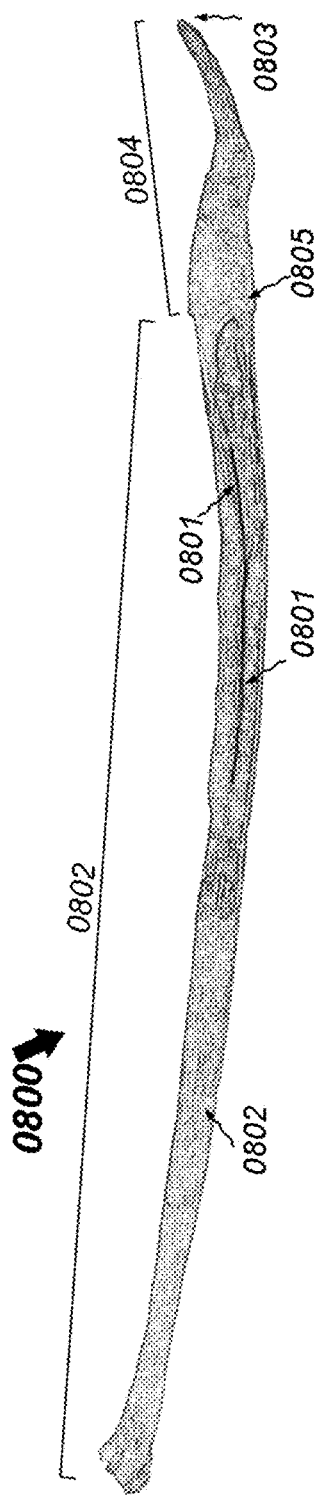
FIG. 8 is a top plan view of a stick-shaped Artificial dehydrated-pizzle pet chew according to the disclosure, where the Artificial dehydrated-pizzle has at least two parts, a tapered head part at an end of it, a stick-shaped body part, similar to traditional dehydrated pizzle (or bully stick) product with a longitudinal groove on the surface of the body part.

In some embodiments, an artificial dehydrated-pizzle (artificial bully stick) component of a pet chew product of the present disclosure has at least two parts, a tapered head part at an end and a body part (typically a stick-shaped body part). The tapered head part is in a shape imitating a similar part of a real (genuine) dehydrated pizzle (real bully stick) product. In at least one embodiment, the tapered head part of the artificial dehydrated-pizzle component is tapered to a rounded tip or a pointed tip at one end. In some embodiments, the tapered head part has an additional rounded tip or pointed tip at one end of the part. The term of "tapered" generally refers to "becoming narrower towards one end" or "becoming gradually narrower towards one end". When an object is "tapered" in the present disclosure, it may be that one end of the object is becoming narrower or gradually narrower toward the tip but the other end may not. When an object is "tapered" in the present disclosure, it may be either substantially straight or not. For example, it may be alternatively bent, curved or crooked. The term of "tapered head part" (or "tapered head portion") in the present disclosure generally refers to one part of an artificial dehydrated-pizzle, where one end of that part is becoming narrower or becoming gradually narrower and the other end of that part joints or meets other part(s) of the artificial dehydrated-pizzle. The benefits of having a tapered head part at an end of an injection-molding-processed artificial dehydrated-pizzle may include at least one of the follows. A, it provides an improved imitation against natural bully sticks than extruded artificial bully sticks without a tapered head; B, it can much easier channel a consumer to associate the artificial dehydrated-pizzle product with natural bully stick than the ones without tapered head part; C, it provides more natural raw shape than the ones without tapered head part; D, it provides more varieties in shapes or appearance than the ones without tapered head part. In some embodiments, there is an additional latitudinal ridge part between the head and body parts of the artificial dehydrated-pizzle component, similar to a natural dehydrated pizzle (or real bully stick) product. In some embodiments, between the aforementioned tapered head part and body part, there is an additional latitudinal ridge part that may protrude from around the body. In some embodiments, between the aforementioned tapered head part and body part, there is an additional raised part or raised area that may protrude from around the body (refer to raised part 0508 from FIG. 5). In some embodiments, it is positioned on the artificial dehydrated-pizzle component between the two ends of it. The raised area may be in a shape looking like a tube extending on the surface of the body part of the artificial dehydrated-pizzle but it is not a separate material from the body. The length of the raised part (raised area) is about 1 cm to 5 cm. The aforementioned ridge part, raised part and raised area may be called "neck part" of the artificial dehydrated-pizzle component, in addition to the body part and tapered head part. In some embodiments, there is an additional substantially round (roundish), substantially oval, substantially heart-shaped or substantially water-drop-shaped part (typically the part has a wrinkled surface, refer to wrinkle 0511 and wrinkle 0512 from FIG. 5) positioned at the (especially stick-shaped) body part of the artificial dehydrated-pizzle, in which the substantially round (roundish), oval or water-drop-shaped part is typically flat in shape, being intended to imitate a natural scrotum part (in a dehydrated status) of an animal (especially a bovine animal). In some embodiments, it looks like that the stick-shaped body part extends on the substantially round (roundish), substantially oval, substantially heart-shaped or substantially water-drop-shaped part in the middle. Part 0510 from FIG. 5 refers to a kind of substantially round (roundish), substantially oval, substantially heart-shaped or substantially water-drop-shaped part. 0515 refers to the profile of part 0510. The aforementioned word of "flat" refers to an object that is not very tall or deep in relation to its length and width, where it does not have to be smooth or uneven on surface. The substantially oval, substantially round, substantially heart-shaped or substantially water-drop-shaped flat portion/part typically is positioned relatively farther away from the end with the tapered head part and nearer/closer to the other end of the chew. Refer to FIG. 1, the artificial dehydrated-pizzle pet chew 0100A has a body part 0106 and a tapered head part 0105 tapering to a rounded tip 0107 at the end. Tapered head part 0105 has some curves (about three curves) in the shape. Between the tapered head part 0105 and body part 0106, there is a "neck part" of the pet chew, 0104, which includes a latitudinal ridge. In some other embodiments, pet chew 0100A does not have a "neck part" between the body part 0106 and tapered head part 0105, where tapered head part 0105 links to body part 0106 directly. Refer to FIG. 2, the artificial dehydrated-pizzle pet chew 0200 has a body part 0208 and a tapered head part 0206 tapering to a rounded tip 0207 at the end. Between the tapered head part 0206 and body part 0208, there is a "neck part" of the pet chew, 0209, which includes a latitudinal ridge part protruding from the material, running latitudinally around the material. In some other embodiments, pet chew 0200 does not have a "neck part" between the body part 0208 and tapered head part 0206, where body part 0028 links to tapered head part 0206 directly. The material of pet chew 0200 may include an outer layer and an inner portion/part, in which the outer layer surrounds the inner portion/part. Refer to FIG. 8, the artificial dehydrated-pizzle pet chew 0800 has a body part 0802 and a tapered head part 0804 tapering to a rounded tip 0803 at the end. Between the tapered head part 0804 and body part 0802, there is a raised part 0805 of the pet chew as a starting point of tapered head part 0804. In some other embodiments, pet chew 0800 does not have a raised part between the body part 0802 and tapered head part 0804, where a body part links to tapered head part directly. Refer to FIG. 5, the artificial dehydrated-pizzle pet chew 0500A has a stick-shaped body part 0507 and a head part 0506, where head part 0506 has a rounded tip 0509 at the end. Between the head part 0105 and stick-shaped body part 0106, there is a "neck part" of the pet chew, neck part 0508, which appears as a raised part. On the stick-shaped body part 0507, there is a substantially round (substantially water-drop) shaped part 0510.

Figure 6:
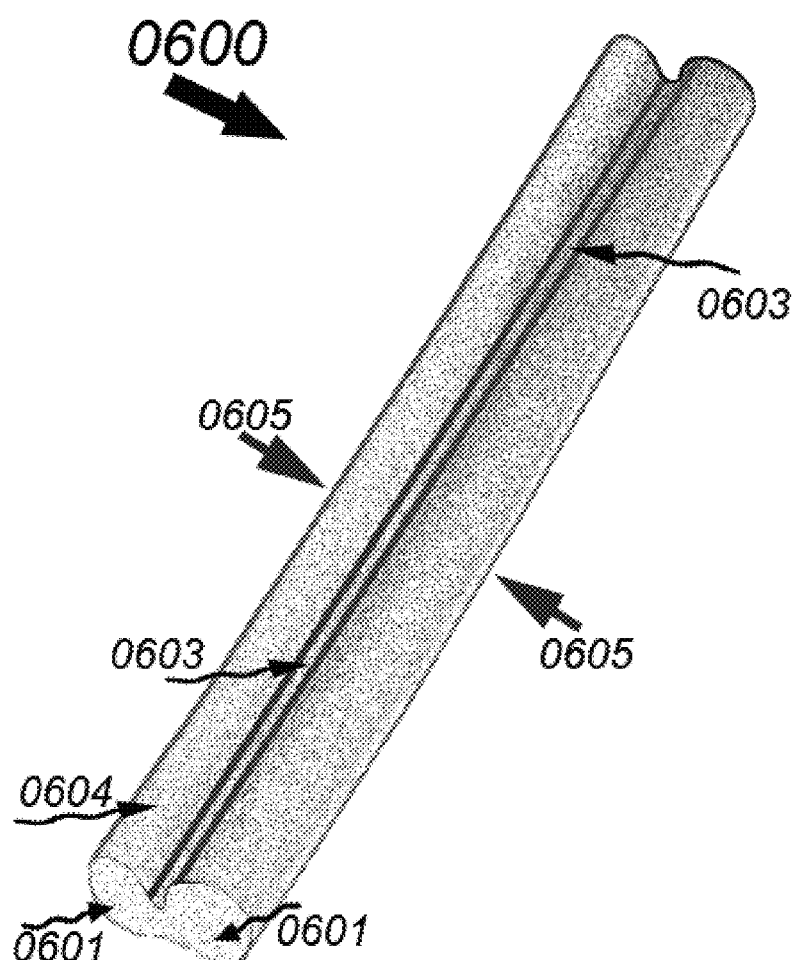
FIG. 6 a top plan view of a stick-shaped Artificial Bully Stick (or say Bully-Stick-LIKE) pet chew according to the disclosure formed from a single piece of material, with a cross section outline shape like capital letter "B".
Figure 13:
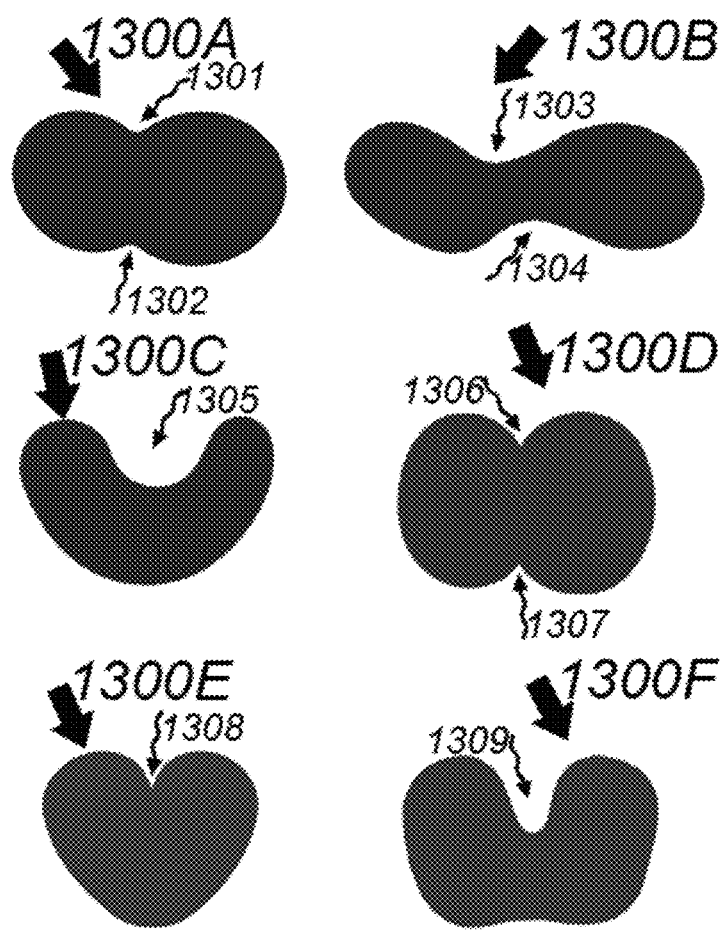
FIG. 13 shows alternative six different cross-section-outline shapes of a stick-shaped Artificial dehydrated-pizzle component of a pet chew according to the disclosure.
Figure 14:
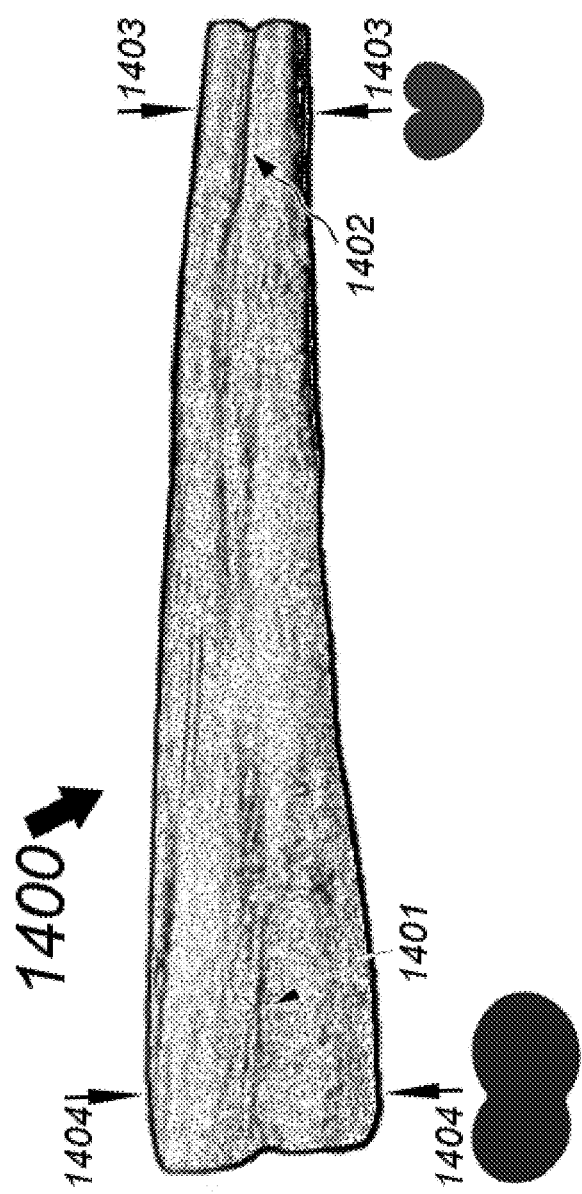
FIG. 14 is a top plan view of a stick-shaped Artificial dehydrated-pizzle (or say Man-made bully stick) pet chew according to the disclosure formed from a single piece of material, with one cross section outline shape similar to capital letter "B" and another similar to "heart icon", where the pet chew is formed by injection molding process.

In some embodiments, the artificial dehydrated-pizzle (artificial bully stick, or bully-stick-like) member/component of the pet chew products of the present disclosure is in a form of a "single piece" of material (one-piece material). The single piece of material (or one-piece material) is composed of a single undivided piece that may not have divided segments in it. For example, it does not have outer layer member or inner member that is formed from two separate materials. As shown in FIG. 6, pet chew product 0600 in stick configuration refers to an embodiment of the present disclosure. 0600 is formed from a single piece of material. 0600 may be formed by injection molding, cast molding, compression molding or extrusion process. The cross section of 0600 at position 0605 is in a shape resembling capital letter "B" as illustrated in FIG. 13 (see 1300F), which is substantially identical to the shape of side 0601 on a longitudinal end of the chew stick. 0603 refers to a groove on the surface running longitudinally through the full length of the pet chew 0600. As illustrated in FIG. 14, pet chew product 1400 in stick configuration refers to an embodiment of the present disclosure, with one end thicker and the other thinner. 1400 is formed from a single piece of material. Alternatively, the artificial bully stick member of the pet chew products of the present disclosure in a form of a "single piece" of material has a hole (hollow space in it) extending inside the body part of the Artificial Bully Stick component. This hole configuration appearing herein may provide some additional benefits such as: A, offering biting elasticity to the whole material; B, providing a space inside the chew to fill additional edible material in which may be attractant materials or flavoring enhancer materials or to fill additional edible material working as an inner portion of the artificial dehydrated-pizzle.

In comparison to other different materials to form a pet chew of the present disclosure, single piece of material may provide some benefits as following. A), Single piece of material may be easier to produce as it only requires one single material for production and potentially one single set of extrusion or injection molding machine system. B), Thanks to the continuity of the material of the pet chew member/component made of a single piece of material, a greater structural strength of the material may be obtained. C), It may better accommodate injection molding processing capability.

Alternatively, the single piece of material forming the pet chew products of the present disclosure has numerous (a plurality of) bubbles, blisters, or air-filled cavities spread into the interior of the material. The benefits of the air bubbles existing herein may include: increasing contract area with dog teeth which penetrate the exterior of the single piece of material, which provides improved tartar and dental plaque control actions; enhancing the imitation action by imitating the interior configurations or texture of a Genuine Bully Stick whose inside part is porous that is formed by tissues of corpus cavernosum and/or spongiosum; being more friendly to puppies or old dogs who have weak teeth while being gnawed. For examples, the artificial dehydrated-pizzle pet chew 0100A as shown in FIG. 1 formed from a single piece of material may include numerous bubbles spread into the interior of the material.

Yet in some other embodiments, the artificial dehydrated-pizzle (or artificial bully stick, or bully-stick-like) pet chew (or pet chew member/component) of the present disclosure includes an outer layer member/portion and an inner member/portion, where the former holds the latter by surrounding it, in a purpose to imitate a typical feature of traditional bully stick (or dehydrated pizzle). In one embodiment, the thickness of the outer layer is substantially homogenous along the whole stick body, as traditional bully stick (or dehydrated pizzle) does. Typical thickness of the outer layer is 0.3 mm-5 mm. As shown in FIG. 2, pet chew 0200 is an extruded pet chew with outer layer portion 0210 and inner portion 0211. Typically, the outer layer 0210 serve as an outer casing for the pet chew surrounding the inner portion 0211, together forming a stick-shape product.

Alternatively, the aforementioned inner portion material filled in the pet chew products of the present disclosure and surrounded by the outer layer portion has numerous (a plurality of) bubbles, blisters, or air-filled cavities spread into the interior of the material. As shown in FIG. 2, pet chew 0200 in stick configuration refers to an embodiment of the present disclosure. Bubbles may appear inside the inner portion 0211. 0210 refers to the outer layer portion of the pet chew. 0200 may be formed by injection molding process in a single injection molding run/cycle within which the outer layer portion and the inner portion are created simultaneously. The outline of a cross section of 0200 is in a shape which includes two notches (u-shaped or v-shaped notches) 0204 and 0212. 0201 and 0202 refer to grooves running longitudinally on the surface of chew 0200. The bubbles may be formed by applying vesicant or blowing agent to the material formula, where the material creates bubbles by injection molding or extrusion process and by the process of material releasing from high pressure area to low pressure area.

In some embodiments, an artificial dehydrated-pizzle (or artificial bully stick, or man-made bully stick) pet chew (or pet chew member/component) of the present disclosure has a (built-in) groove form longitudinally running (or extending) along the body portion of the stick-shaped pet chew on the surface of the artificial dehydrated-pizzle (member/component), with a purpose to imitate or approximate a typical inherent groove of traditional dehydrated pizzle (or bully stick) products. It should be noted that, there are various shapes/structures/appearance that genuine bull stick products may possess, which makes it hard to identify a common structural feature of them. The present disclosure arrives at that, "groove" may be a key feature that the artificial dehydrated-pizzle (or artificial bully stick, or man-made bully stick) products should possess in a purpose to imitate/approximate genuine dehydrated pizzle (or bully stick) appearance although genuine dehydrated pizzle (or bully stick) has various shapes/structures and various cross section shapes. This disclosure discloses a viable imitation method to imitate traditional dehydrated pizzle (or bully stick) appearance. Additionally, the form of "groove" appearing on the pet chew may provide extra benefits of tooth cleaning action, where the groove form may accommodate dog tooth configurations and have it slide along the two walls of the groove while being gnawed by a dog, and thus tartar or dental plaque may be mechanically removed hereby. In some embodiments, the length of a groove that extends on the body part of the artificial dehydrated-pizzle accounts for at least ¼ (more typically at least ⅓) of the length of the full body part, in which the groove may be a noticeable one on the surface. A typical groove depth of the artificial bully stick is at least 1 mm as that of a genuine dehydrated pizzle (or bully stick) does. Typically, the depth of a groove of the artificial bully stick accounts for at least 5% (more typically at least 10%) of the thickness of the artificial bully stick. A depth accounting for "5% of the thickness" may be the least one that makes a groove noticeable to consumers when it appears on the surface of an Artificial Bully Stick component. Refer to FIG. 1, 0100A is a pet chew with groove 0101, a groove along the stick-shaped body part imitates natural Bully Sticks, in which the length of the groove is nearly equal to that of the body part 0106 of the pet chew. Refer to FIG. 6, 0600 is an extruded pet chew with 0603, a groove along the stick body imitates natural Bully Sticks, which is formed by an extruder die with pre-designed shape forming a groove in an extruding process. As shown in FIGS. 13, 1301 to 1309 refer to nine "notch" (groove) areas in the six different cross section shapes of pet chews according to the present disclosure. In some embodiments, an artificial dehydrated-pizzle component of a pet chew of the present disclosure has at least two separate longitudinal grooves running on the surface of the body part, typically at different longitudes of the body part. Refer to FIG. 2, artificial dehydrated-pizzle pet chew 0200 has two grooves, groove 0201 and groove 0202, on the surface of its stick-shaped body part 0208. The view of cross section 0200A is obtained at position 0203 of body part 0208, with two notches (u-shaped or v-shaped notches), notch 0204 and notch 0212, corresponding to groove 0201 and groove 0202 respectively. The average depth of the groove 0201 is greater than that of the groove 0202. The length of groove 0201 is about seven tenth of the length of stick-shaped body part 0208, and the length of groove 0202 is about five tenth of it.

Figure 7:
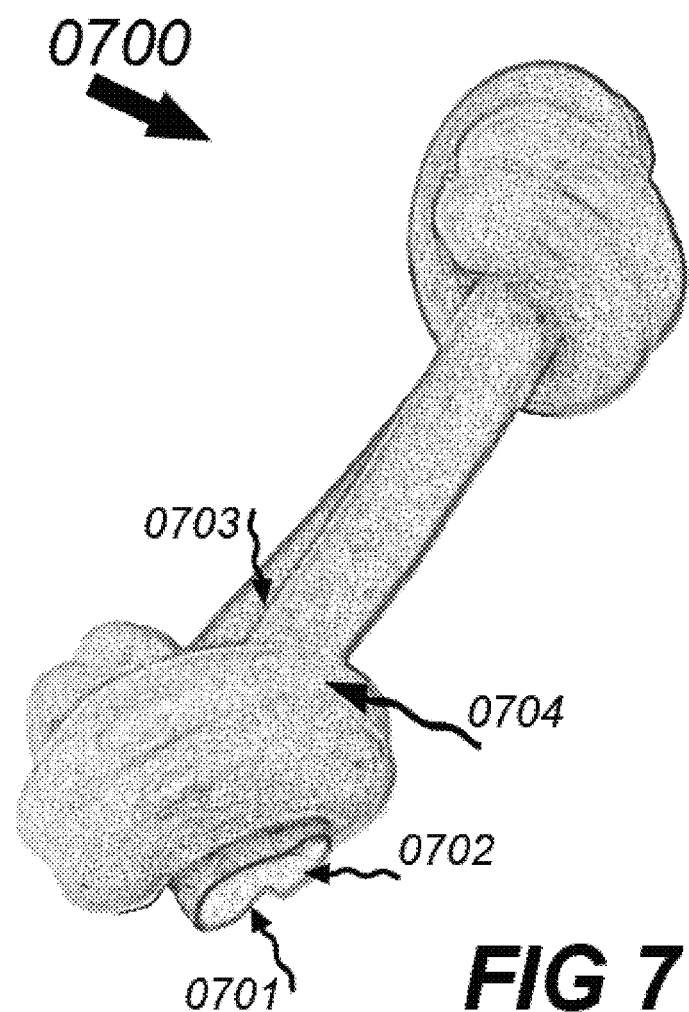
FIG. 7 is a top plan view of an Artificial Bully Stick pet chew according to the disclosure in a knotted bone shape, whose Artificial Bully Stick component is formed from a single piece of material.

In some embodiments of the present disclosure, cross-section outline shapes of artificial dehydrated-pizzle (or artificial bully stick, or man-made bully stick) pet chews resemble the cross-section outline shapes of a natural dehydrated pizzle (or natural Bully Sticks) chew, with a purpose to imitate or approximate Bully Sticks. Natural bully sticks have various cross section outline shapes which are inherently determined by raw material of pizzles. In one embodiment, a cross section of an artificial dehydrated-pizzle pet chew (artificial dehydrated-pizzle member/component) of the present disclosure is in an outline shape substantially similar to capital letter "B", or cashew nut (icon), or peanut (icon), or heart icon, or Arabic numeral "8", imitating/approximating a typical cross section outline shape of traditional bully stick (or dehydrated pizzle) as aforementioned. These typical outline shapes of the artificial dehydrated-pizzle (shapes that are similar to capital letter "B", or cashew nut (icon), or peanut (icon), or heart icon, or Arabic numeral "8") have a common feature, where the outline shapes have a "notch" area whose bottom is significantly lower than the outline's overall edge. The "notch" appearing on the outline shapes are created by aforementioned "groove" that runs longitudinally along the artificial dehydrated-pizzle body. These specific cross section outline shapes (shapes that are similar to capital letter "B", or cashew nut (icon), or peanut (icon), or heart icon, or Arabic numeral "8") with distinct "notch" part may well fulfill the natural bully stick imitation purposes. As shown in FIG. 13, 1300A, 1300B, 1300C, 1300D, 1300E and 1300F illustrate six alternative cross section outline shapes of pet chews according to the present disclosure. The shape of 1300A and 1300B both are similar to a peanut icon. And the shapes of 1300C, 1300D, 1300E and 1300F resemble cashew nut icon, Arabic numeral "8", heart icon and capital letter "B" respectively. The cross-section shapes of the artificial dehydrated-pizzle as illustrated in FIG. 6 and FIG. 7 resemble a capital letter "B". The cross-section shapes at two different positions of the pet chew stick from FIG. 14 resemble a peanut icon and a heart icon respectively. As shown in FIG. 6, 0600 is an extruded pet chew with a typical cross section outline shape similar to capital letter "B" corresponding to the cross section outline shape 1300F from FIG. 13, with a purpose to imitate a typical cross section outline shape of traditional bully stick (or dehydrated pizzle). And in some other alternative embodiments, the cross section outline shape of pet chew 0600 from FIG. 6 may be replaced by other desired shapes such as 1300A, 1300B, 1300C, 1300D and 1300E as illustrated in FIG. 13.

In one embodiment, inner member color of the artificial dehydrated-pizzle (or artificial bully stick, or bully-stick-like) pet chew is comparatively lighter than outer layer color, as genuine bully stick does. Inner member color is typically white or yellowing white. Outer layer color is typically light brown, brown, dark brown, red brown or muscle color.

In one embodiment, the chew body or the outer layer of the stick-shaped artificial dehydrated-pizzle (or artificial bully stick, or bully-stick-like) pet chew of the present disclosure is translucent, in a purpose to imitate a typical appearance of traditional bully stick (or dehydrated pizzle).

In some embodiments, the thickness of outer layer of the artificial dehydrated-pizzle of the present disclosure is typically 0.3 mm-5 mm, imitating the thickness feature of traditional bully stick (or dehydrated pizzle) products.

In one embodiment, inner member of the artificial dehydrated-pizzle (artificial bully stick) pet chew of the present disclosure has a bubble, blister or air-filled cavity (numerous bubbles, blisters or air-filled cavities), being intended to imitate/approximate the appearance/texture/structure of inner part of traditional bully stick (or dehydrated pizzle) that is formed by tissues of corpus cavernosum and/or spongiosum. Alternatively, there are edible-granule-formed materials appearing in the inner member (creating visual illusion of pore-like forms), being intended to visually imitate appearance of inner part of traditional bully stick (or dehydrated pizzle) that is formed by tissues of corpus cavernosum and/or spongiosum. In one embodiment, these tiny bubbles or edible-granule-formed materials spread substantially homogeneously to the inner member material. In one embodiment, inner member of the artificial bully stick pet chew of the present disclosure is comparatively more unconsolidated or looser in texture than the outer layer.

In one embodiment, the artificial dehydrated-pizzle (or artificial bully stick, or bully-stick-like) pet chew includes artificial pizzle flavor (or say bully stick flavor) or hydrolyzed pizzle ingredient (this can also provide strong pizzle flavor) in its formula, which further enhances its attraction to dogs and consumers.

In some embodiments of the present disclosure, the outer hardness of the artificial dehydrated-pizzle (artificial bully stick) pet chew is with a durometer value between 80 and 100. In other embodiments of the present disclosure, the hardness of the edible pet chew is with a durometer value between 60 and 80. In other embodiments of the present disclosure, the hardness of the edible pet chew is with a durometer value between 50 and 60. In other embodiments of the present disclosure, the hardness of the edible pet chew is with a durometer value between 40 and 50.

In some embodiments of the present disclosure, the artificial dehydrated-pizzle (or artificial bully stick, or man-made bully stick) pet chews are formed from a single piece of material having air bubbles inside the artificial dehydrated-pizzle chew material.

In some embodiments of the present disclosure, an artificial dehydrated-pizzle (man-made bully stick) pet chew is provided with at least one injection-molding-processed artificial dehydrated-pizzle component with a tapered head part which is shaped to a final product shape such as stick shape, twisted stick shape, spiral shape, pretzel knot shape, knotted bone shape, ring shape, woven braid configuration and etc. within the injection mold. Alternatively, the aforementioned final product shapes such as stick shape, twisted stick shape, spiral shape, pretzel knot shape, knotted bone shape, ring shape and woven braid shape may be obtained by manipulating (such as twisting and knotting by hand) an initially-stick-shaped artificial dehydrated-pizzle (initial stick shape formed by injection mold) into a product shape before being hardened to a final product.

Here go the formulas that may alternatively form the man-made dehydrated-pizzle (or artificial bully stick, or bully-stick-like) pet chew (or pet chew member/component) in some embodiments of the present disclosure.

Firstly the phrase of "on an as formulated basis" in the present disclosure that may be used in following paragraphs is defined here. It is about a means to determine weight percentages of an ingredient in a product. "On an as formulated basis" is also a method that currently FDA (or AAFCO) organizations of USA usually utilize to determine weight percentage for an ingredient in a product. By the means of "on an as formulated basis", the weight percentage of an ingredient in a food is determined as it is added in the formulation of the food, including its inherent water content, not counting the water added for processing. All weight percentage values of ingredients appearing in the present disclosure apply this "on an as formulated basis" rule.

In one embodiment, the formula of the artificial dehydrated-pizzle (or artificial bully stick, or man-made bully stick) pet chew (or pet chew member/component) of the present disclosure includes a specific meat by-products, pizzle (or animal penis) ingredient. The term of "pizzle ingredient" or "pizzle material" that works as an ingredient to form a composite material forming the man-made dehydrated-pizzle refers to a material derived from animal pizzle, which may be in a form of fresh pizzle, dehydrated pizzle, dried pizzle, ground pizzle, ground dehydrated pizzle, enzymatic pizzle or hydrolyzed pizzle. The advantages of including this specific meat by-products, pizzle ingredient, in the formula may include at least one of the follows (from point 1 to 4):

1. This product is an injection molding (or molded, or extruded) man-made dehydrated-pizzle—(artificial bully stick) pet chew formed from a composite material intended to imitate the properties of traditional dehydrated pizzle (or bully stick) products. A formula with pizzle will make the pet chew not only with a traditional dehydrated pizzle (or bully stick) appearance, but also with real pizzle (bully stick) ingredients, where the product formula feature is in conformity with product appearance. The selling points of finished products are thus enhanced by the conformity.
2. Another advantage of applying pizzle ingredient to the man-made dehydrated-pizzle (artificial bully stick) pet chew formula is that, it provides a good means to make full use of pizzle leftovers created from genuine dehydrated pizzle (or bully stick) manufacturing industry. A marketable genuine dehydrated pizzle (or bully stick) need be fairly long, for example at least longer than 4". A bully stick product less than for example 4" has a jeopardy of dog choking. Most popular bully stick length welcome by consumers is 6" and 12". Producing 6"/12" bully sticks by cutting a pizzle with initial length to desired length certainly generate a lot of small sized pizzle segments. These segments were purchased with a full price but manufacturers did not come up with a method to make good use of them. The man-made dehydrated-pizzle (artificial bully stick) pet chew of the present disclosure can well make use of the pizzle segments by for example grinding them to small pieces and having them added to its composite formula.
3. Yet another advantage of applying pizzle ingredient to the man-made dehydrated-pizzle (artificial bully stick) pet chew formula is that, the pizzle ingredient can provide natural pizzle flavor to the pet chew without adding artificial flavors. Natural pizzle flavor is thought to be a healthier element than artificial pizzle flavors.
4. Pizzle ingredient is a natural premium protein source for a pet chew product.

In one embodiment, the artificial dehydrated-pizzle (or artificial bully stick, or man-made bully stick) pet chew (or pet chew member/component) of the present disclosure includes at least 3% pizzle (or animal penis) ingredient in formula. The reason why the proportion of pizzle ingredient in the formula need follow the specific "at least 3% pizzle ingredients" may go as follows (point 1 and 2):

1. "At least 3% pizzle" provides basic inherent attractant attracting dogs to chew on. Per palatability tests conducted by present inventor, this man-made dehydrated-pizzle (artificial bully stick) pet chew with less than 3% cannot provide basic inherent attraction to dogs without aid of another attractant ingredient. "At least 3% pizzle" offering "start point" palatability. The inventor conducted palatability contrast tests to determine the smallest percentage of pizzle ingredient to put into the man-made dehydrated-pizzle (artificial bully stick) pet chew. The test interprets that when the pizzle percentage goes up to 3% or larger than 3%, a jump of number of preferences appears versus plain injection molding (or molded, or extruded) stick chews w/o pizzle ingredient. And the preference is consistent when the pizzle percentage stays at 3% to 10%. Therefore 3% is determined to be the minimum pizzle percentage in the man-made dehydrated-pizzle (artificial bully stick) pet chew.
2. At least 3% pizzle in formula enables product labeling to claim "with pizzle", or "with real pizzle", or "with bully stick ingredient" or "with real bully stick" on consumer packages, enhancing product selling points to consumers. A product with less than 3% pizzle cannot indicate "with pizzle" on package labels legally. This is a favorable advantage for the man-made dehydrated-pizzle (artificial bully stick) pet chew product to indicate "with pizzle" as a part of product name which makes the product attractive to consumers (remarks: if the ingredient goes to at least 25%, it will be applied to "dinner" rule in labeling). According to labeling model regulations by AAFCO (the Association of American Feed Control Officials), an ingredient cannot appear as a part of product name or be highlighted on the principal display panel if the ingredient accounts for less than 3% in product formula on an as formulated basis.

In some embodiments, the artificial dehydrated-pizzle (or artificial bully stick, or man-made bully stick) pet chew (or pet chew member/component) includes 3%-50% pizzle ingredient.

In some embodiments, the artificial dehydrated-pizzle (or artificial bully stick, or man-made bully stick) pet chew (or pet chew member/component) includes 5%-65% (more typically 10%-25%) pizzle ingredient on an as formula basis in its formula. The bully-stick-like pet chew (or pet chew member/component) with over 50% (especially over 65%) pizzle ingredient is considered too expensive, which could violate the initial intention of introducing this product. Also, the artificial dehydrated-pizzle (artificial bully stick) pet chew (or pet chew member/component) with over 50% (especially over 65%) pizzle ingredient is considered to be able to ruin the "durability" of the pet chew. The reason is, the more an injection molding (or molded, or extruded) pet chew contains meat (meat by-product), the less durability the injection molding (or molded, or extruded) pet chew will be with. Pizzle is an animal source meat-by-product-ingredient. According to R&D findings by the inventor, 10%-25% pizzle ingredient in the artificial dehydrated-pizzle (artificial bully stick) pet chew (or pet chew member/component) is an optimized one, which provides a balance between durability, material cost, sufficient inherent natural pizzle flavor and natural protein source.

The inventor conducted palatability contrast tests to determine the starting percentage of pizzle ingredient to put into the artificial dehydrated-pizzle (artificial bully stick) pet chew (or pet chew member/component) that can secure an absolute preference for dogs for the pet chew. The test interprets that when the pizzle percentage goes up to 10% or larger than 10%, an absolute preference appears versus plain injection molding (or molded, or extruded) stick chews w/o pizzle ingredient. On the other hand, the more pizzle in a pet chew, the more expensive the pet chew will be. 10%-25% is one pizzle percentage range in the artificial dehydrated-pizzle (artificial bully stick) pet chew that can provide a balance between "palatability" and cost.

In one embodiment, the artificial dehydrated-pizzle (artificial bully stick, or bully-stick-like) pet chew (or pet chew member/component) of the present disclosure includes a plant ingredient in the formula. This artificial dehydrated-pizzle (artificial bully stick) pet chew product is an injection-molding (or extruded, or cast molding, or compression molding) product. Plant ingredient is an often-used material for injection-molding (or extruded, or cast molding, or compression molding) products, which may have advantages of the follows (point 1, 2, 3 and 4):
1. Significantly lower cost than animal ingredients.
2. Provides vegetable nutrition offering a nutrition balance and a healthy diet.
3. Facilitates to make the artificial dehydrated-pizzle (artificial bully stick) pet chew with ideal durability/hardness which enables it to imitate this essential property of traditional dehydrated pizzle (or bully stick). Plants especially plant starch is a good material for injection molding (or molded, or extruded) products which can facilitate the achievement of ideal durability/hardness especially in an extruding (or injection molding) process. A theory explains how it works: When the starch part of plant material is cooked or heated at a particular temperature in extruder or injection molding machine (the temperature is generally >40° C. and what the particular temperature depends on the nature of various types of the starch), heat causes the crystalline regions of the starch to become diffuse, so that the chains begin to separate into an amorphous form. The intermolecular bonds of starch molecules begin to break down. Starch dissolves in water to a sort of paste status. Thus, gelatinization occurs in the starch which offers the durability/hardness property for the pet chew.
4. Can materially imitate a desirable "translucent" appearance of the artificial dehydrated-pizzle (artificial bully stick) which may be a property of traditional (genuine) dehydrated pizzle (or bully sticks).

A typical material working as a plant ingredient is plant starch, such as (but not limited to) corn starch, sweet potato, sweet potato starch, tapioca starch and potato starch.

In one embodiment, the artificial dehydrated-pizzle (artificial bully stick) component of the present disclosure includes at least 20% (for example 20%-90% plant, more typically 20%-50%) plant ingredient by weight on an as formulated basis.

It should be noted that the "plant" ingredient in the present disclosure refers to all edible plant materials and edible-plant-derived materials, such as (but not limited to) vegetables, fruit, edible-plant-derived materials, vegetable-derived materials, fruit-derived materials, plant protein, vegetable protein, plant starch, vegetable starch, grains, cereals, corn, gluten-free edible plant and gluten-free vegetables. Gluten-free plant and gluten-free vegetables may be applied as "plant ingredient" since gluten materials are considered by experts in this industry as the ones that could potentially make dogs allergic. Examples of gluten-free plant material are tapioca, soybean, sweet potato, potato and carrot.

The reasons why it is optimal to be larger than 20% (specifically) plant ingredient in the artificial dehydrated-pizzle (artificial bully stick) component go as follows: 1. According to our research tests, 20% plant ingredient appearing in the artificial dehydrated-pizzle (artificial bully stick) formula is the least one that can successfully facilitate recipe to make the artificial dehydrated-pizzle (artificial bully stick) product with ideal durability/hardness which enables it to imitate this essential property of traditional dehydrated pizzle (or bully stick). 2. Recipe with less than 20% plant ingredient fails to do that way with unsatisfactory durability product.

In one embodiment, the artificial dehydrated-pizzle (artificial bully stick, or bully-stick-like) stick-shaped pet chew is typically in length of about 6" or 12", which is considered as most popular stick length welcome by consumers. Diameter of the stick-shaped chew could be 1 cm to 5 cm.

In one embodiment, the artificial dehydrated-pizzle (artificial bully stick, or bully-stick-like) pet chew member/component includes an animal ingredient (such as meat and meat by-products) ingredient in the formula.

It should be noted that the "meat" ingredient in the present disclosure is defined as the material selected from (but not limited to) the group consisting of: animal flesh, animal muscle, poultry meat, chicken, chicken breast, duck, goose, turkey, venison, porcine meat, pork, bovine meat, beef, mutton, lamb, goat meat, fish, meat meal, chicken meal, fish meal, hydrolyzed meat protein, hydrolyzed animal material, hydrolyzed animal protein, meat derived ingredient and poultry derived ingredient.

It should also be noted that the "meat by-product" ingredient in the present disclosure is defined as the material typically selected from (but not limited to) the group consisting of: animal pizzle, porcine meat by-product, poultry by-product, bovine meat by-product, animal viscera, animal stomach, animal tongue, animal kidney, animal blood, animal bone, partially defatted low temperature fatty tissue, animal intestines, animal spleen, animal liver, animal lung, animal heart, animal pizzle, meat by-product meal, poultry by-product meal, hydrolyzed meat-by-products protein, hydrolyzed meat-by-products material, meat by-product derived ingredient, poultry by-product derived ingredient, animal fat and animal oil. It should be noted that the "meat by-product" in the present disclosure does not include animal hide/skin material and collagen material with the reasons of: A, both animal hide/skin material and collagen do not have attractive flavor urging dogs to chew. B, manufacture of animal hide and collagen is relatively unregulated industry. It may create pollution to environment. H2O2 and NaOH chemicals that are used for rawhide manufacture and heavy metals may remain in finished products which harm dogs' health.

Animal ingredient (such as Meat and Meat By-products) is an often-used material for injection-moulding (or extruded, or cast moulding, or compression moulding) products with advantages of the follows (point 1 and 2). "Animal ingredient" is defined as edible materials derived from slaughtered animals. It includes (but not limited to) meat, meat by-products. It does not include hair, horns, teeth and hoofs.

1. Inherent good palatability. Dogs are carnivorous, which have an inherent appetite to eat meat (meat by-product) food. Meat (meat by-product) ingredients in a pet chew works as an attractant providing inherent good palatability for the pet chew.
2. Nutrition. Meat (or meat by-product) as a perfect source of animal protein, offering good nutrition to dogs.

In some embodiments, the artificial dehydrated-pizzle (artificial bully stick, or bully-stick-like) pet chew (or pet chew member/component) includes 3%-80% (typically 10%-50%) animal ingredient (meat ingredient and/or meat by-products) in its formula on an as formula basis.

The reason why in some embodiments, the proportion of animal ingredient in a formula need follow the specific "at least 3% animal ingredient" may go as follows (point 1 and 2 below):

1. "At least 3% meat (or meat by-product)" provides basic inherent attractant attracting dogs to chew on. Per palatability tests conducted by the present inventor, this artificial dehydrated-pizzle (artificial bully stick) pet chew with less than 3% cannot provide basic inherent attraction to dogs without aid of other attractant ingredient. "At least 3% meat (meat by-product)" offering "start point" palatability.
2. At least 3% meat (meat by-product) in formula enables product labeling to claim "with meat (meat by-product)" or "with real meat (meat by-product)" on consumer packages, enhancing product selling points to consumers. A product with less than 3% meat (meat by-product) cannot indicate "with meat (meat by-product)" on package labels legally. This is a favorable advantage for the artificial dehydrated-pizzle (artificial bully stick) pet chew product to indicate "with meat (meat by-product)" as a part of product name which makes the product attractive to consumers (remarks: if the ingredient goes to at least 25%, it will be applied with "dinner" rule in labeling). According to labeling model regulations by AAFCO (the Association of American Feed Control Officials), an ingredient cannot appear as a part of product name or be highlighted on the principal display panel if the ingredient accounts for less than 3% in product formula on an as formulated basis.

In one embodiment, in addition to animal ingredient, the artificial dehydrated-pizzle (artificial bully stick, or bully-stick-like) pet chew (or pet chew member/component) further includes a chemical in formula. The chemical is introduced to provide the artificial dehydrated-pizzle (artificial bully stick) pet chew sufficient rigidity/durability and strength in finished product. The chemical is selected from the group consisting of a thickener, a humectant, a stabilizer, an emulsifier, a gelatinizer, a binder, and a filler.

The thickener is selected from the group consisting of: glucose syrup, malt syrup, soy protein Isolate, wheat protein isolate, corn protein isolate, artemisia gum, linseed gum, deacetylated chitin, pectins, sodium alginate, xanthan gum, carrageenan; phosphated distarch phosphate, sodium lactate, diacetyl tartaric acid ester of mono(di)glycerides (DATAE), sesbania gum, polyglycerol esters of fatty acid (polyglycerol monostearate, polyglycerol monooleate), maltitol, sorbitol, propylene glycol, ablmoschus manihot gum, β-cyclodextrin, arabic gum, starch acetate, guar gum, potassium alginate, carob bean gum, gellan gum, sodium polyacrylate, distarch phosphate, gelatin, hydroxypropyl, distarch phosphate, hydroxypropyl methyl cellulose, agar, acid treated starch, sodium carboxy methyl cellulose, oxidized starch and oxidized hydroxypropyl starch.

The humectant is selected from the group consisting of: soy protein Isolate, wheat protein isolate, corn protein isolate, glucose syrup, malt syrup, sodium pyrophosphate, trisodium orthophosphate, sodium hexametaphosphate, sodium tripolyphosphate, phosphoric acid, calcium dihydrogen phosphate, sodium lactate, maltitol, sorbitol, propylene glycol, glycerin, sodium dihydrogen phosphate, sodium phosphate dibasic, potassium lactate, sodium lactate, acetylated distarch phosphate and acetylated distarch adipate.

The stabilizer is selected from the group consisting of: trisodium orthophosphate, potassium sorbate, sodium stearoyl lactylate, calcium stearoyl lactylate, phosphoric acid, hydroxypropyl starch, pectins, xanthan gum, carrageenan, sodium lactate, polyglycerol esters of fatty acid (polyglycerol monostearate, polyglycerol monooleate), maltitol, sorbitol, propylene glycol, propylene glycol esters of fatty acid and glucono delta-lactone.

The emulsifier is selected from the group consisting of: soy protein Isolate, wheat protein isolate, corn protein isolate, Sucrose esters of fatty acid, sodium hexametaphosphate, sodium stearoyl lactylate, calcium stearoyl lactylate, hydroxypropyl starch, pectins, carrageenan, diacetyl tartaric acid ester of mono(di)glycerides (DATAE), polyglycerol esters of fatty acid (polyglycerol monostearate, polyglycerol monooleate), maltitol, sorbitan monolaurate, sorbitol, propylene glycol, propylene glycol esters of fatty acid, polyoxyethylene xylitan monostearate, tripolyglyceryl monostearate, potassium stearate, mono-(di-,tri-)glycerides of fatty acids, modified soybean phospholipid, sodium caseinate, citric and fatty acid esters of glycerol, lactic and fatty acid esters of glycerol, sodium starch octenyl succinate and acetylated monoand diglyceride (acetic and fatty acid esters of glycerol).

The gelatinizer is selected from the group consisting of: soy protein Isolate, wheat protein isolate, corn protein isolate, propylene glycol, glucono delta-lactone.

The binder is selected from the group consisting of: glutinous rice flour, gelatin, linseed gum, pectins, xanthan gum, carrageenan, sesbania gum, maltitol, sodium alginate, ablmoschus manihot gum, arabic gum, guar gum, Carob bean gum, gellan gum and agar.

The filler is selected from the group consisting of: a plant material, a plant derived material, a plant protein and a plant starch, saccharide, dextrin, lactose, mineral salt and fructose.

In some embodiments, the artificial dehydrated-pizzle (or artificial bully stick, or man-made bully stick, or bully-stick-like) pet chew of the present disclosure is free of animal hide/skin materials and/or free of collagen materials with the concerns of drawbacks of animal hide/skin and collagen mentioned in previous paragraphs.

In some embodiments to form a composite/composition for making the artificial dehydrated-pizzle (artificial bully stick, or bully-stick-like) pet chew (or pet chew member/component), in addition to animal ingredient, animal hide material is used. A small percentage of animal hide (for example <20%) may help strengthen the durability of the stick-shaped pet chew. But due to the disadvantages of animal hide material as mentioned in above paragraphs, animal hide material to be used to form the composite/composition is required to be at a limited percentage by weight. It's anticipated that when animal hide percentage in the composite/composition goes higher than 50%, animal hide material will be an absolute majority ingredients existing in the pet chew formula, which makes the pet chew product an animal hide-based product. A pet chew product made from animal hide-based material is thought to significantly involve in an unhealthy product concern and environment harm concern. Therefore, in some embodiments where animal hide exists in the formula of the artificial dehydrated-pizzle (artificial bully stick) pet chew (or pet chew member/component), it is optimal to have the animal hide material account for less than 50% in weight in its formula. More typically, animal hide material account for 5%-20% in weight in its formula.

In some embodiments of the present disclosure, the artificial dehydrated-pizzle (artificial bully stick, or bully-stick-like) pet chew (or pet chew member/component) of the present disclosure includes a plant ingredient (>20%) and an animal ingredient (typically meat or meat-by-products. remarks: meat-by-products includes pizzle) in the formula, forming a pet chew with a texture resembling that of traditional dehydrated pizzle (or bully stick) product.

In some embodiments of the present disclosure, the artificial dehydrated-pizzle (artificial bully stick, or bully-stick-like) pet chew (or pet chew member/component) of the present disclosure includes a hydrolyzed animal protein ingredient and a plant ingredient (plant ingredient >20%) in the formula. The hydrolyzed animal protein (such as hydrolyzed meat protein) may work as an attractant in the recipe.

In some embodiments of the present disclosure, the artificial dehydrated-pizzle (artificial bully stick, or bully-stick-like) pet chew (or pet chew member/component) of the present disclosure includes a pizzle ingredient and a plant ingredient (>20%) in the formula.

In some embodiments of the present disclosure, the artificial dehydrated-pizzle (artificial bully stick, or bully-stick-like) pet chew of the present disclosure includes a pizzle ingredient, a plant ingredient and a meat ingredient in the formula.

In yet some other embodiments of the present disclosure, the artificial dehydrated-pizzle (artificial bully stick) pet chew (or pet chew member/component) of the present disclosure includes a plant ingredient (>20%) and a meat by-products ingredient in the formula.

In an embodiment of the present disclosure, the artificial dehydrated-pizzle (artificial bully stick, or bully-stick-like) pet chew (or pet chew member/component) of the present disclosure includes 20%-50% plant ingredient, 10%-50% meat ingredient and a chemical.

In an embodiment of the present disclosure, the artificial dehydrated-pizzle (artificial bully stick, or bully-stick-like) pet chew (or pet chew member/component) of the present disclosure includes 0.3%-5% hydrolyzed animal protein ingredient, 20%-90% plant ingredient, 5%-50% meat ingredient and a chemical.

In an embodiment of the present disclosure, the artificial dehydrated-pizzle (artificial bully stick, or bully-stick-like) pet chew (or pet chew member/component) of the present disclosure includes 3%-25% pizzle, 50%-90% plant ingredient and a chemical.

In an embodiment of the present disclosure, the artificial dehydrated-pizzle (artificial bully stick, or bully-stick-like) pet chew (or pet chew member/component) of the present disclosure includes 3%-25% meat by-products, 50%-90% plant ingredient and a chemical.

In an embodiment of the present disclosure, the artificial dehydrated-pizzle (artificial bully stick, or bully-stick-like) pet chew (or pet chew member/component) of the present disclosure includes 3%-25% pizzle, 20%-50% plant ingredient, 10-50% animal-hide ingredient and a chemical.

Although extrusion process may be beneficial in various circumstances to produce the artificial dehydrated-pizzle (artificial bully stick) pet chews, a virtually unlimited variety of 3-dimensional shaped artificial dehydrated-pizzle (or artificial bully stick, or man-made bully stick) chew products can be produced by applying injection molding techniques instead, in which the extrusion process is incapable. Additionally, artificial dehydrated-pizzle formed by injection-molding process can provide a benefit of being capable of imitating or approximating the complicated and irregular surface texture of a real bully stick, which extrusion process cannot do. Thus, injection-molding process provides an improved imitation against real bully stick product. Injection molding is a process whereby a thermoplastic material (such as the aforementioned composite material to form the artificial bully stick product) is fed into a heated barrel, mixed, and forced by injection into a cavity of a rigid frame called a mold, where it cools and hardens (sets) to the product configuration corresponding to the cavity design. For example, artificial dehydrated-pizzle products as illustrated in FIG. 1, FIG. 2, FIG. 8, FIG. 3, FIG. 4 and FIG. 14 are formed by injection-molding process.

As an exemplary injection-molding process for making the artificial dehydrated-pizzle (artificial bully stick, or bully-stick-like) pet chew of the present disclosure, it includes (from point A to F): A, prepare a metal mold in a desired shape according to targeted product, either as a single cavity or multiple cavities; B, prepare an edible thermoplastic composite material, for example in a granule form. (an exemplary formula to form the composite material may include 20%-50% plant ingredient, 10%-50% meat (meat by-product) ingredient and 3%-25% pizzle); C, the material goes down from a hooper, melted, fed through a heated chamber and forced through a plunger into the hollow mould; D, after the cavity has been filled, a holding pressure is continuously applied in this packing stage and the melt material is compacted to increase the density of it; E, the part cools and solidifies; F, the mold opens and the product is ejected from the mould.

In some embodiments, the artificial dehydrated-pizzle (artificial bully stick, or bully-stick-like) pet chew is formed by extruding process with an extruder (typically co-extruding extruder system). Extruding process may provide some benefits such as production efficiency, pressure-generating durability, two-layer-extrusion availability, etc. As an exemplary co-extrusion process for making the artificial dehydrated-pizzle (artificial bully stick, or bully-stick-like) pet chew of the present disclosure, it includes (from point A to D):

(A) Prepare an edible thermoplastic composite material. An exemplary formula to form the composite material may include 20%-50% plant ingredient, 10%-50% meat (meat by-product) ingredient and 3%-25% pizzle).

(B) Deliver the Composite A and Composite B into a co-extrusion extruder, and heat the composites in the extruder at a high temperature at least 40° C. before their being extruded at the extruder die into a stick form. Extrude the composites with the extruder.

(C) Divide the extruded stick to pre-determined smaller sized ones in a finished pet chew product form.

(D) Dry and harden the product by heating for sufficient time and obtain a final finished dog chew product. Moisture of final finished products may be in a range of 8%-18%.

In some embodiments of the present disclosure, the stick-shaped pet chews are formed by co-extruding process and the formula forming the outer layer is different from the one forming the inner member. The intention to apply different formulas to the outer layer and the inner member is to achieve different texture, and/or looking, and/or coloring, and/or durability/hardness, and/or density, etc., which could make a one distinguished from the other, imitating traditional dehydrated pizzle (or bully stick) products.

Here are some embodiments of the present disclosure in various pet chew shapes/configurations.

Now refer to FIG. 1, 0100A refers to a stick-shaped artificial dehydrated-pizzle pet chew which is formed by injection-molding process in a stick-shaped mold, including a tapered head part 0105 and a stick-shaped body part 0106. It may also include a ridge at the "neck part" 0104. A groove 0101 runs longitudinally on the surface of the stick-shaped body part 0106. Cross section view 0100C is obtained at position 0102 of body part 0106, with a notch (u-shaped notch) 0103 which may be created by groove 0101. 0100B refers to a bottom view of the pet chew 0100A.

Figure 3:
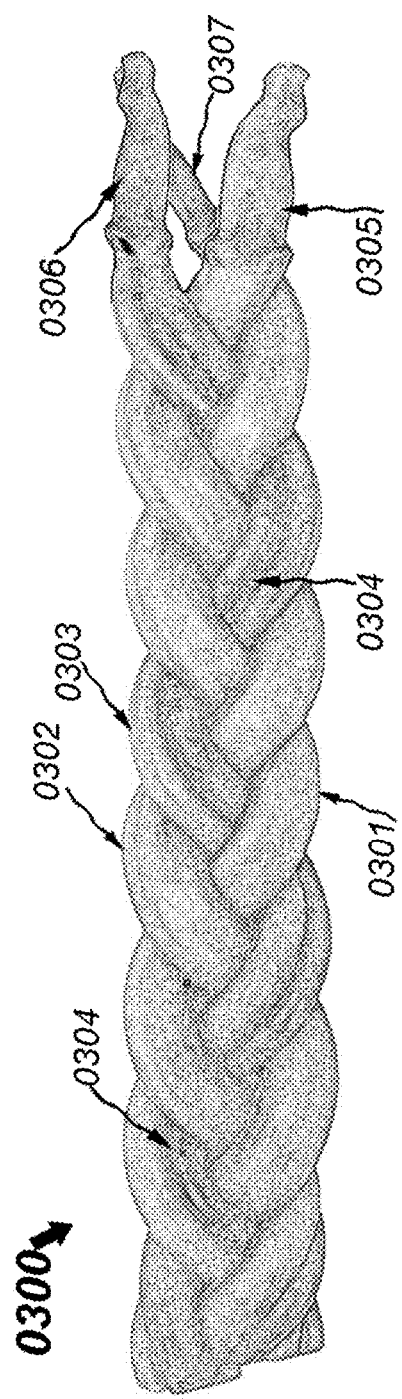
FIG. 3 is a top plan view of a pet chew according to the disclosure in a braid configuration, which is formed from three separate stick-shaped Artificial dehydrated-pizzle components being woven together each of which has a tapered head part at an end of it.

Now refer to FIG. 3, 0300 is an embodiment of the present disclosure, an edible pet chew with three separate artificial bully stick components (0301, 0302 and 0303) woven together to form a braid-shaped chew. Each of the three artificial bully stick components, 0301/0302/0303, has a tapered head part 0305/0306/0307. 0304 is a groove running on the surface of artificial bully stick component 0303.

Now refer to FIG. 4, 0400 is an embodiment of the present disclosure, an artificial dehydrated-pizzle pet chew in ring shape formed from a piece of artificial dehydrated-pizzle component. The artificial dehydrated-pizzle includes a body part 0401 and a tapered head part 0403. 0402 is a groove existing in the body part of the artificial dehydrated-pizzle. The artificial dehydrated-pizzle may be formed by injection-molding process with a ring-shaped mold. Alternatively, a process to form the ring-shaped artificial dehydrated-pizzle includes a first step of forming a stick-shaped artificial dehydrated-pizzle by injection-molding in a stick-shaped mold and a second step of reshaping the stick-shaped artificial dehydrated-pizzle to a ring-shaped one.

Now refer to FIG. 5, edible pet chew 0500A is an embodiment of the present disclosure. 0500B and 0500C reflect a bottom view and oblique view of the same product. Pet chew 0500A is formed by injection-molding process, including a head part 0506, a stick-shaped body part 0507 and a raised area part 0508. Head part 0506 has a rounded tip 0509 at a far end of it. Raised area part 0508 protrudes from around body part 0507 and visually looks like a tube extending on the surface of body part 0507, but it is not a separate material from body part 0507. 0506, 0507 and 0508 are formed by a single piece of material, being inseparable and integrated. A substantially round (roundish), substantially oval, substantially heart-shaped or substantially water-drop-shaped part 0510 is positioned on body part 0507, being flat in shape. 0510 is positioned relatively farther away from the end with head part 0506 and nearer/closer to the other end of the chew. Part 0510 has a wrinkled surface texture and wrinkle 0511 and wrinkle 0512 are some representative wrinkles. It looks like that, body part 0507 runs on part 0510 in the middle of it. 0515 refers to the profile of part 0510. Groove 0501-0505 and groove 0513 refer to grooves running on the surfaces of head part 0506 and body part 0507. Groove 0514 refers to a long continuous groove runs at the full length of body part 0507.

Now refer to FIG. 7, 0700 is an embodiment of the present disclosure, an edible pet chew formed from a member of artificial dehydrated-pizzle in a form of knotted bone shape. 0702 is a side on one end of the chew in a shape of capital "B". 0703 refers to the groove configuration existing in the artificial dehydrated-pizzle member. It may be formed by an extrusion process. A composite material is fed to an extrusion with an extruder die with a capital-"B"-shaped opening and when it leaves the extruder die it is in a shape of stick. The stick shaped item is then manipulated (by hand) to a knotted bone product before the material is hardened.

In some embodiments of the present disclosure, an additional Edible Material component is applied together with the component of artificial dehydrated-pizzle 0100A (from FIG. 1) or 0600 (from FIG. 6), where the edible material component and the artificial dehydrated-pizzle component are assembled together to form a final product. The artificial dehydrated-pizzle component 0100A may be reshaped by hand to a new shape before it gets hardened while being assembled with the edible material component according to desired finished pet chew structure. The edible pet chew may be shaped to a final product shape such as stick shape, twisted stick shape, spiral shape, pretzel knot shape, knotted bone shape, ring shape, woven braid configuration and etc.

In some embodiments of the present disclosure, a member/component of animal hide (say rawhide) is applied together with the member/component of artificial bully stick pet chew 0100A (from FIG. 1) or 0600 (from FIG. 6), where the animal hide (say rawhide) member/component and the artificial bully stick member/component are assembled together to form a pet chew. The artificial bully stick component 0100A may be pre-shaped to a new shape before being assembled with the animal hide member/component according to desired finished pet chew structure.

In yet some embodiments of the present disclosure, a member/component of Genuine Animal Pizzle material is applied together with a member/component of artificial bully stick pet chew 0100A (from FIG. 1) or 0600 (from FIG. 6), where the Genuine animal Pizzle material member/component and the stick-shaped artificial bully stick component are assembled together to form a pet chew.

In the trade of traditional dehydrated pizzle (or bully stick), sometimes original bully stick is longitudinally split to several separate pieces of slimmer sticks with desired diameters. The slimmer sticks are packed as final products for consumers. In some embodiments of the present disclosure, artificial bully stick pet chew imitates the traditional dehydrated pizzle (or bully stick) that is longitudinally split traditional dehydrated pizzle (or bully stick) as above-described.

As a formula embodiment to form the composite/composition to produce the stick-shaped artificial dehydrated-pizzle (or artificial bully stick, or bully-stick-like) pet chew, the composite/composition consists of: Rice flour (67.2%, classified as plant ingredient), vegetable glycerin (8%), gelatin (7%), fresh chicken breast (5% classified as meat ingredient), ground bovine tendon (3%, classified as meat-by-products ingredient), cellulose powder (2%, classified as plant ingredient), calcium carbonate (2%), sweet potato (2%, classified as plant ingredient), lecithin (1%), carrageenan gum (1%), hydrolyzed pizzle (0.5% classified as meat-by-products ingredient), brewers yeast (0.5%), titanium dioxide (0.4%), FD&C yellow 6 (0.2%), FD&C red 40 (0.1%), FD&C blue 1 (0.1%). In this formula, meat-by-products ingredient occupies 3.5% in the formula, plant ingredient totally 71.2%, and meat 5%. Vegetable glycerin, calcium carbonate, carrageenan gum, titanium dioxide, FD&C yellow 6, FD&C red 40 and FD&C blue 1 are some chemicals.

As another formula embodiment to form the composite/composition to produce the artificial dehydrated-pizzle (or artificial bully stick, or bully-stick-like) stick-shaped pet chew, the composite/composition consists of: Rice flour (43.6%, classified as plant ingredient), fresh chicken breast (30%, classified as meat ingredient), vegetable glycerin (8%), gelatin (7%), chicken cartilage (2% classified as meat ingredient), cellulose powder (2%, classified as plant ingredient), calcium carbonate (2%), sweet potato (2%, classified as plant ingredient), lecithin (1%), carrageenan gum (1%), brewers yeast (1%), titanium dioxide (0.4%). In this formula, plant ingredient occupies totally 47.6% in the formula, and meat totally 32%. Vegetable glycerin, calcium carbonate, carrageenan gum and titanium dioxide are some chemicals.

As another formula embodiment to form the composite/composition to produce the artificial dehydrated-pizzle (or artificial bully stick, or bully-stick-like) stick-shaped pet chew, the composite/composition consists of: Fresh chicken breast (28.00%, classified as meat ingredient), tapioca starch (20.00%, classified as plant ingredient), ground pizzle (12.00%, classified as pizzle ingredient), gelatin (12.00%), vegetable glycerin (8.00%), rawhide (5.00%), sorbitol (3.60%), cellulose powder (3.00%, classified as plant ingredient), calcium carbonate (3.00%), sweet potato (2.00%, classified as plant ingredient), lecithin (1.00%), carrageenan gum (1.00%), brewers yeast (1.00%), titanium dioxide (0.40%). In this formula, pizzle ingredient occupies 12% in the formula, meat 28% and plant ingredient totally 25%. Vegetable glycerin, sorbitol, calcium carbonate, carrageenan gum and titanium dioxide are some chemicals.

What is claimed is:

1. An edible pet chew, comprising an artificial dehydrated-pizzle component, wherein the artificial dehydrated-pizzle component is in a form imitating a shape of a dehydrated pizzle, wherein the artificial dehydrated-pizzle component is formed by an injection molding, cast molding or compression molding process;
    wherein the artificial dehydrated-pizzle component comprises a tapered head part, wherein said tapered head part has a rounded or pointed tip at one end;
    wherein the artificial dehydrated-pizzle component comprises a groove on the surface;
    wherein the artificial dehydrated-pizzle component is formed from a composite material, and the composite material comprises at least 20% plant ingredient by weight in a formula.

2. The edible pet chew according to claim 1, wherein the artificial dehydrated-pizzle component further comprises a body part, and wherein the groove extends longitudinally on a surface of the body part.

3. The edible pet chew according to claim 2, wherein the artificial dehydrated-pizzle component further comprises a ridge part or a raised area between the head part and the body part.

4. The edible pet chew according to claim 2, wherein the body part is a stick-shaped body part, and wherein the artificial dehydrated-pizzle component further comprises a substantially oval part, substantially round part, substantially heart-shaped part or substantially water-drop-shaped part being positioned on said stick-shaped body part.

5. The edible pet chew according to claim 1, wherein the artificial dehydrated-pizzle component is shaped to a final product shape, and wherein the final product shape is in a form selected from the group consisting of: stick, knot bone, braid, twist stick, spiral, ring and pretzel knot.

6. The edible pet chew according to claim 1, wherein the artificial dehydrated-pizzle component is a stick-shaped artificial dehydrated-pizzle component, wherein said artificial dehydrated-pizzle component is imitating a shape of a pizzle selected from the group consisting of: beef pizzle, bovine pizzle, bully pizzle, cattle pizzle, swine pizzle, horse pizzle, donkey pizzle, deer pizzle, ovine pizzle, caprine pizzle, sheep pizzle and goat pizzle.

7. The edible pet chew according to claim 6, wherein the artificial dehydrated-pizzle component comprises an outer layer portion and an inner portion, wherein the outer layer portion has a hole longitudinally extending inside the outer layer portion and the inner portion is filled into the hole.

8. The edible pet chew according to claim 1, further comprising a second artificial dehydrated-pizzle component, wherein the first artificial dehydrated-pizzle component and the second artificial dehydrated-pizzle component are woven together to make a final product in a braid form.

9. The edible pet chew according to claim 1, wherein the composite material is rawhide free.

10. The edible pet chew according to claim 1, wherein the composite material further comprises at least 3% animal pizzle ingredient in the formula.

11. The edible pet chew according to claim 10, wherein the composite material comprises 50%-90% plant ingredient by weight on an as formulated basis and 3%-25% animal pizzle ingredient by weight on an as formulated basis.

12. The edible pet chew according to claim 1, wherein the composite material comprises 20%-90% plant ingredient by weight in the formula.

13. The edible pet chew according to claim 1, wherein the composite material further comprises an animal ingredient, and the animal ingredient is one of: a meat ingredient, a meat by-products ingredient and a combination thereof.

14. The edible pet chew according to claim 13, wherein the composite material comprises 3%-50% animal ingredient by weight on an as formulated basis.

15. The edible pet chew according to claim 14, wherein the composite material comprises 20%-50% plant ingredient by weight on an as formulated basis and 10%-50% animal ingredient by weight on an as formulated basis.

16. The edible pet chew according to claim 1, wherein the composite material further comprises an animal hide ingredient, and wherein the composite material comprises 20%-90% plant ingredient by weight and 5%-50% animal hide ingredient by weight.

17. The edible pet chew according to claim 1, wherein the composite material further comprises a hydrolyzed animal protein ingredient.

18. The edible pet chew according to claim 1, wherein the plant ingredient is an ingredient selected from the group consisting of: vegetables, fruit, edible-plant-derived materials, vegetable-derived materials, fruit-derived materials, plant protein, vegetable protein, plant starch, vegetable starch, grains, cereals, corn, sweet potato, gluten-free edible plant, and gluten-free vegetables.

19. The edible pet chew according to claim 13, wherein the composite material further comprises a chemical, wherein the composite material comprises 10%-50% animal ingredient on an as formulated basis in the formula by weight and the chemical;
    wherein the meat ingredient is selected from the group consisting of: animal flesh, animal muscle, poultry meat, chicken, chicken breast, duck, goose, turkey, venison, porcine meat, pork, bovine meat, beef, mutton, lamb, goat meat, fish, meat meal, chicken meal, fish meal, hydrolyzed meat protein, hydrolyzed animal material, hydrolyzed animal protein, meat derived ingredient, and poultry derived ingredient; and wherein the meat by-products ingredient is selected from the group consisting of: animal pizzle, porcine meat by-products, poultry by-products, bovine meat by-products, animal viscera, animal stomach, animal tongue, animal kidney, animal blood, animal bone, partially defatted low temperature fatty tissue, animal intestines, animal spleen, animal liver, animal lung, animal heart, meat by-products meal, poultry by-products meal, hydrolyzed meat-by-products protein, hydrolyzed meat-by-products material, meat by-products derived ingredient, poultry by-products derived ingredient, animal fat, and animal oil.

20. The edible pet chew according to claim 1, wherein the edible pet chew further comprises an edible material component, wherein the artificial dehydrated-pizzle component and the edible material component are assembled together to form a final product.

21. The edible pet chew according to claim 20, wherein the artificial dehydrated-pizzle component and the edible material component are shaped together to a final product shape selected from the group consisting of: stick shape, twisted stick shape, spiral shape, pretzel knot shape, knotted bone shape, ring shape and woven braid shape.

22. The edible pet chew according to claim 20, wherein the edible material component is one of: an animal hide material and an animal pizzle material.

* * * * *